United States Patent
Kitaichi et al.

(10) Patent No.: US 9,185,255 B2
(45) Date of Patent: Nov. 10, 2015

(54) IMAGE READING DEVICE, AND IMAGE FORMING APPARATUS

(71) Applicant: FUJI XEROX CO., LTD., Tokyo (JP)

(72) Inventors: Yasuhiro Kitaichi, Kanagawa (JP); Hiroshi Watanabe, Kanagawa (JP); Tadashi Sugizaki, Kanagawa (JP); Mari Uematsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/479,758

(22) Filed: Sep. 8, 2014

(65) Prior Publication Data
US 2015/0264207 A1   Sep. 17, 2015

(30) Foreign Application Priority Data

Mar. 12, 2014   (JP) ................................ 2014-049107

(51) Int. Cl.
| | |
|---|---|
| *H04N 1/04* | (2006.01) |
| *G06K 7/00* | (2006.01) |
| *G06K 9/22* | (2006.01) |
| *H04N 1/00* | (2006.01) |
| *H04N 1/12* | (2006.01) |

(52) U.S. Cl.
CPC ....... *H04N 1/00798* (2013.01); *H04N 1/00557* (2013.01); *H04N 1/123* (2013.01)

(58) Field of Classification Search
None
See application file for complete search history.

(56) References Cited

U.S. PATENT DOCUMENTS

| | | | | |
|---|---|---|---|---|
| 4,868,672 | A * | 9/1989 | Hiroki et al. | 358/494 |
| 7,872,779 | B2 * | 1/2011 | Nagatani | 358/474 |
| 7,894,106 | B2 * | 2/2011 | Fujioka et al. | 358/474 |
| 7,916,360 | B2 * | 3/2011 | Akahane | 358/497 |
| 8,040,577 | B2 * | 10/2011 | Akiyama | 358/486 |
| 8,218,204 | B2 * | 7/2012 | Hozono | 358/474 |
| 2005/0157353 | A1 * | 7/2005 | Nishinohara et al. | 358/474 |
| 2006/0109525 | A1 * | 5/2006 | Evans | 358/483 |
| 2006/0112845 | A1 * | 6/2006 | Ouchi | 101/467 |
| 2006/0269342 | A1 * | 11/2006 | Yoshida et al. | 400/62 |
| 2007/0002397 | A1 * | 1/2007 | Osakabe et al. | 358/474 |
| 2007/0030534 | A1 * | 2/2007 | Ikeno et al. | 358/498 |
| 2007/0091465 | A1 * | 4/2007 | Ichikawa et al. | 359/726 |
| 2008/0044211 | A1 * | 2/2008 | Otomo et al. | 399/395 |
| 2008/0117481 | A1 * | 5/2008 | Akiyama | 358/488 |
| 2010/0020201 | A1 * | 1/2010 | Chao et al. | 348/239 |
| 2010/0231983 | A1 * | 9/2010 | Nozaki | 358/426.01 |

(Continued)

FOREIGN PATENT DOCUMENTS

| | | |
|---|---|---|
| JP | A-2007-13309 | 1/2007 |
| JP | A-2012-151568 | 8/2012 |

*Primary Examiner* — Madelein Nguyen
(74) *Attorney, Agent, or Firm* — Oliff PLC

(57) ABSTRACT

Provided is an image reading device including a platen that supports an original document on which an image is recorded, a reading unit that is opposed to the original document with the platen interposed therebetween, and includes a reading member which reads the image on the original document extending in a first direction, and a supporting member that supports the reading member, is movable along a second direction intersecting with the first direction, and is movably supported such that the reading member reads the image on the original document in the first and second directions, a guiding member that extends in the second direction and guides the supporting member when the supporting member is moved in the second direction, and a moving member that is disposed to be separated from the guiding member in the first direction and moves the supporting member along the second direction.

6 Claims, 15 Drawing Sheets

(56) References Cited

U.S. PATENT DOCUMENTS

| | | | |
|---|---|---|---|
| 2010/0284048 A1* | 11/2010 | Hou et al. | 358/486 |
| 2011/0002013 A1* | 1/2011 | Kido | 358/401 |
| 2011/0049794 A1* | 3/2011 | Kinoshita et al. | 271/227 |
| 2011/0188101 A1* | 8/2011 | Tsujimura | 358/498 |
| 2012/0140293 A1* | 6/2012 | Taki | 358/474 |
| 2012/0176653 A1* | 7/2012 | Washida | 358/482 |
| 2013/0182273 A1* | 7/2013 | Lee et al. | 358/1.13 |
| 2013/0335788 A1* | 12/2013 | Utsunomiya | 358/474 |
| 2014/0063572 A1* | 3/2014 | Yamasaki | 358/497 |
| 2015/0195420 A1* | 7/2015 | Osakabe et al. | 358/497 |

* cited by examiner

IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2014-049107 filed Mar. 12, 2014.

BACKGROUND 1. (i) Technical Field

The present invention relates to an image reading device, and an image forming apparatus.

2. (ii) Related Art

In the related art, image reading apparatuses have the following known configurations including: not only a configuration where only a light source section moves and a reading member such as a CCD is stationary when the apparatus reads a medium on which an image is recorded, that is, a so-called original document; but also a configuration where an image is read by integrally moving a light source section and a reading member.

SUMMARY

According to an aspect of the invention, there is provided an image reading device including:

a platen that supports an original document on which an image is recorded;

a reading unit that is opposed to the original document with the platen interposed therebetween, and includes a reading member which reads the image on the original document extending in a first direction, and a supporting member that supports the reading member, is movable along a second direction intersecting with the first direction, and is movably supported such that the reading member reads the image on the original document in the first and second directions;

a guiding member that extends in the second direction and guides the supporting member when the supporting member is moved in the second direction; and a moving member that is disposed to be separated from the guiding member in the first direction and moves the supporting member along the second direction;

wherein the supporting member supports the reading member, in order for the reading member to read the original document, in a state where the reading member is inclined with respect to the supporting member in a direction to negate inclination of the supporting member which is inclined with respect to the first direction when the moving member moves the supporting member in the second direction.

BRIEF DESCRIPTION OF THE DRAWINGS

Exemplary embodiments of the present invention will be described in detail based on the following figures, wherein:

FIG. 7A is an explanatory diagram of exploded sections, and FIG. 7B is a diagram viewed from a direction of the arrow VIIB of FIG. 7A;

FIG. 14A is a top plan view corresponding to FIG. 8 of Example 1, and FIG. 14B is a diagram viewed from a direction of the arrow XIVB of FIG. 14A;

FIG. 15A is a top plan view corresponding to FIG. 14A of Example 3, and FIG. 15B is a side view corresponding to FIG. 14B of Example 3; FIG. 16A is a top plan view corresponding to FIG. 14A of Example 3, and FIG. 16B is a side view corresponding to FIG. 14B of Example 3.

DETAILED DESCRIPTION

Figure 1:
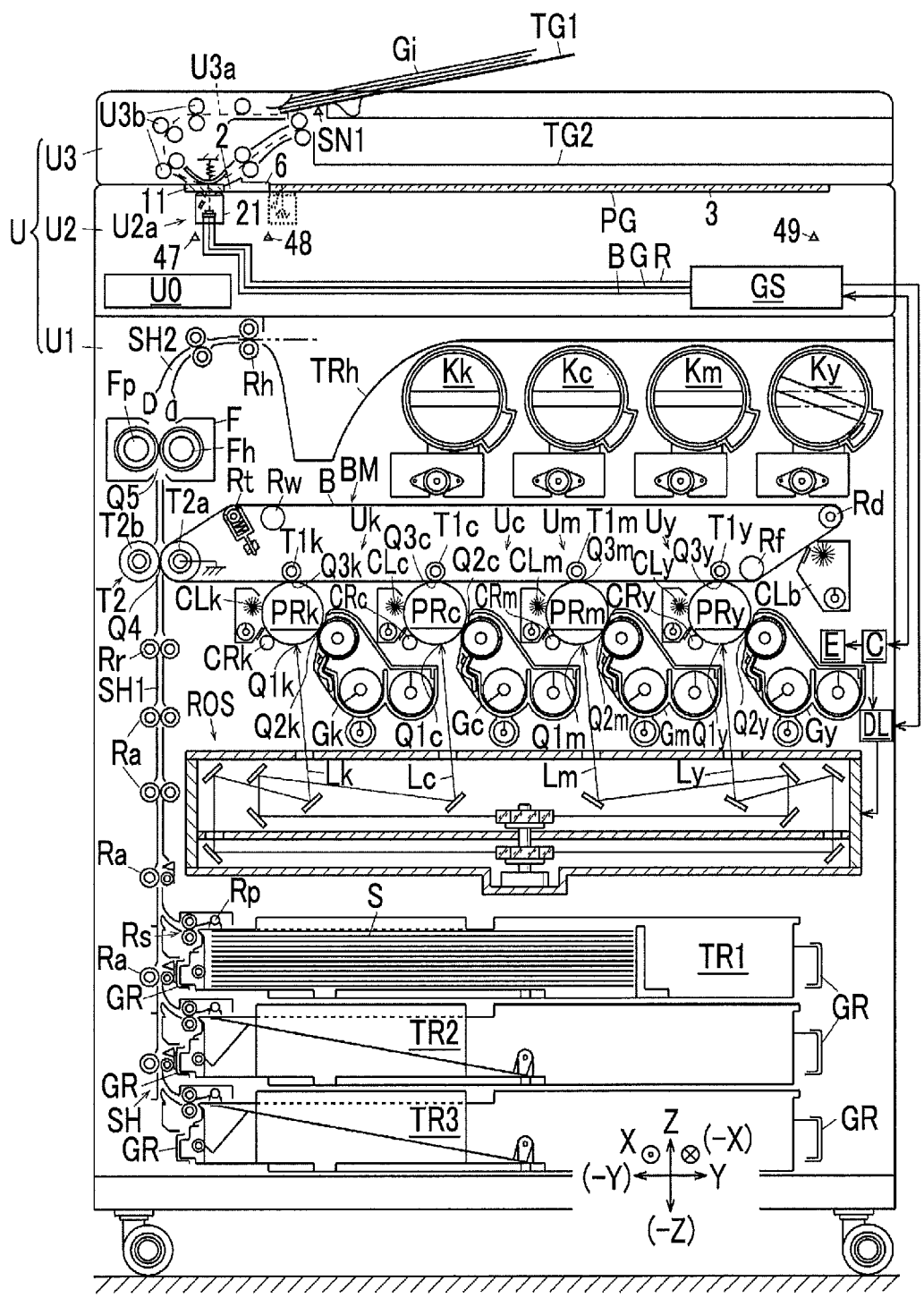
FIG. 1 is an explanatory diagram of the entirety of an image forming apparatus of Example 1.

Hereinafter, specific examples (hereinafter referred to as examples) of exemplary embodiments of the present invention will be described with reference to the drawings. However, the present invention is not limited to the following examples.

In order to facilitate understanding of the following description, in the drawings, the X-axis, Y-axis, and Z-axis directions correspond to the front-rear, left-right, and top-bottom directions, respectively; and the directions or sides indicated by the arrows X, −X, Y, −Y, Z, and −Z correspond to the forward, backward, rightward, leftward, upward, and downward directions, or the front, rear, right, left, upper, and lower sides.

In the drawings, a reference sign represented by "●" included in "○" is defined as an arrow directed from the rear side to the front side of the sheet, and a reference sign represented by "X" included in "○" is defined as an arrow directed from the front side to the rear side of the sheet.

In order to facilitate understanding of the following description, in the description referring to the drawings, the members not necessary for the description are appropriately omitted in the drawings.

Example 1

FIG. 1 is an explanatory diagram of the entirety of an image forming apparatus of Example 1.

In FIG. 1, a copy machine U, which is an example of the image forming apparatus according to Example 1, includes a printer section U1, which is an example of a recording section and an example of an image recording device. A scanner section U2, which is an example of a reading section and an example of an image reading device, is supported on the printer section U1. An auto-feeder U3, which is an example of a document transport device, is supported on the scanner section U2. A user interface U0, which is an example of an input section, is supported on the scanner section U2 of Example 1. A user may operate the copy machine U by inputting instructions through the user interface U0.

An original document tray TG1, which is an example of the media container, is disposed on the auto-feeder U3. The original document tray TG1 may contain a stack of sheets of original document Gi to be copied. An original document discharging tray TG2, which is an example of an original document discharging section, is disposed below the original document tray TG1. Original document feed rollers U3b are disposed along an original document transport path U3a between the original document tray TG1 and the original document discharging tray TG2.

A platen glass PG, which is an example of a transparent platen, is disposed on the top surface of the scanner section U2. In the scanner section U2 of Example 1, a reading unit U2a is disposed below the platen glass PG. The reading unit U2a of Example 1 is supported so as to be movable in the left-right direction, which is sub-scanning direction, along the lower surface of the platen glass PG. Normally, the reading unit U2a is stationary at the home position indicated by the solid line of FIG. 1. In addition, the reading unit U2a is electrically connected to an image processing section GS.

Figure 2:
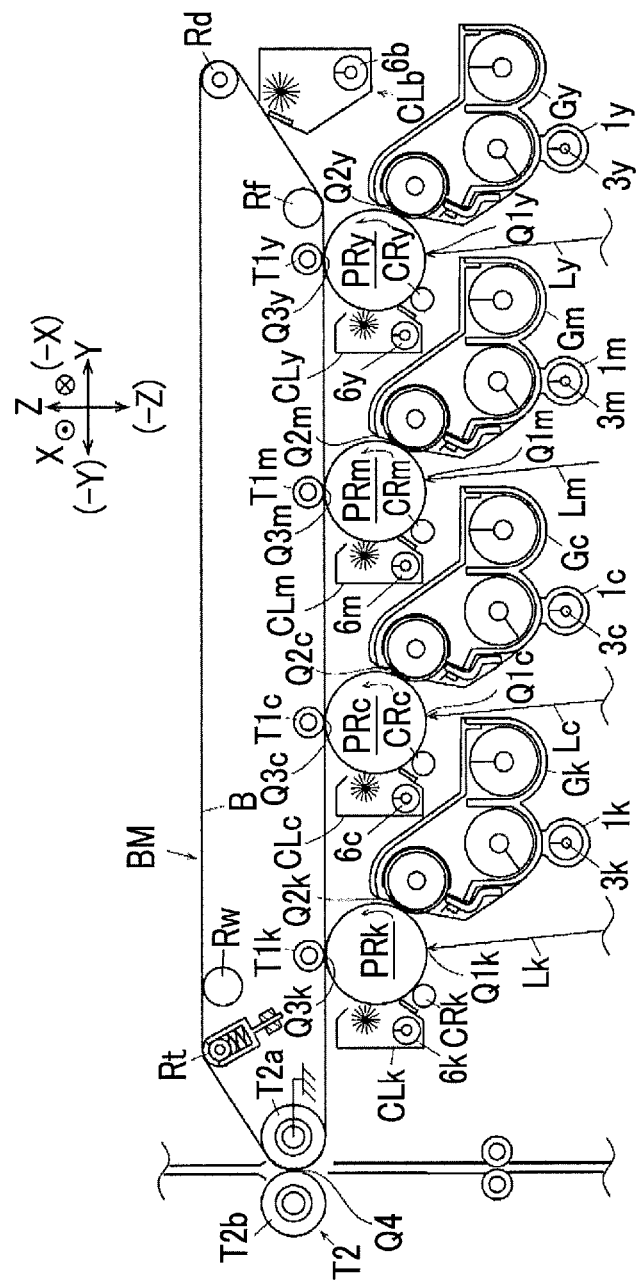
FIG. 2 is an explanatory diagram of the main sections of an image recording section of Example 1.

FIG. 2 is an explanatory diagram of the main sections of an image recording section of Example 1.

The image processing section GS is electrically connected to a writing circuit DL of the printer section U1. The writing circuit DL is electrically connected to an exposure device ROS, which is an example of a latent-image forming device.

The exposure device ROS of Example 1 is configured to be capable of outputting laser beams Ly, Lm, Lc, and Lk corresponding to the respective colors of Y, M, C, and K as examples of writing beams. The exposure device ROS is configured to be capable of outputting the laser beams Ly to Lk corresponding to signals which are input from the writing circuit DL.

In FIG. 1, photoconductors PRy, PRm, PRc, and PRk, which are examples of image holding members, are disposed above the exposure device ROS. In FIGS. 1 and 2, regions in which the respective photoconductors PRy to PRk are irradiated with the laser beams Ly to Lk constitute writing regions Q1y, Q1m, Q1c, and Q1k.

Charging rollers CRy, CRm, CRc, and CRk, which are examples of electric chargers, are disposed upstream of the writing regions Q1y to Q1k in a direction of rotation of the photoconductors PRy, PRm, PRc, and PRk. The charging rollers CRy to CRk of Example 1 are supported to be rotatable in contact with the photoconductors PRy to PRk.

Developing devices Gy, Gm, Gc, and Gk are disposed downstream of the writing regions Q1y to Q1k in the direction of rotation of the photoconductors PRy to PRk. Regions in which the respective developing devices Gy to Gk face the respective photoconductors PRy to PRk constitute development regions Q2y, Q2m, Q2c, and Q2k.

Primary transfer rollers T1y, T1m, T1c, and T1k, which are examples of primary transfer units, are disposed downstream of the developing devices Gy to Gk in the direction of rotation of the photoconductors PRy to PRk.

Regions in which the respective primary transfer rollers T1y to T1k face the respective photoconductors PRy to PRk constitute primary transfer regions Q3y, Q3m, Q3c, and Q3k.

Photoconductor cleaners CLy, CLm, CLc, and CLk, which are examples of cleaning units for the image holding members, are disposed downstream of the primary transfer rollers T1y to T1k in the direction of rotation of the photoconductors PRy to PRk.

The Y-color photoconductor PRy, the charging roller CRy, the exposure device ROS that outputs the Y-color laser beam Ly, the developing device Gy, the primary transfer roller T1y, and the photoconductor cleaner CLy constitute a Y-color image forming section Uy which is an example of a Y-color visible image formation device of Example 1 that forms a toner image as an example of the visible image. Likewise, the photoconductors PRm, PRc, and PRk, the charging rollers CRm, CRc, and CRk, the exposure device ROS, the developing devices Gm, Gc, and Gk, the primary transfer rollers T1m, T1c, and T1k, and the photoconductor cleaners CLm, CLc, and CLk constitute image forming sections Um, Uc, and Uk for the M, C, and K colors.

A belt module BM, which is an example of an intermediate transfer device, is disposed above the photoconductors PRy to PRk. The belt module BM has an intermediate image transfer belt B which is an example of an intermediate transfer body. The intermediate image transfer belt B is constituted by an endless belt-like member.

The intermediate image transfer belt B of Example 1 is rotatably supported by: a belt driving roller Rd that is an example of a driving member; a tension roller Rt that is an example of a tension member; a working roller Rw that is an example of a member for correcting offset; an idler roller Rf that is an example of a driven member; a backup roller T2a that is an example of a member facing the secondary transfer region; and the primary transfer rollers T1y, T1m, T1c, and T1k.

A secondary transfer roller T2b, which is an example of a secondary transfer member, is disposed at a position opposed to the backup roller T2a with the intermediate image transfer belt B interposed therebetween. In Example 1, the backup roller T2a is grounded, and a secondary transfer voltage having a polarity opposite to a polarity of the charge of the toner is applied to the secondary transfer roller T2b from a power circuit E. The backup roller T2a and the secondary transfer roller T2b constitute a secondary transfer unit T2 of Example 1. Further, a region in which the secondary transfer roller T2b comes into contact with the intermediate image transfer belt B constitutes a secondary transfer region Q4.

A belt cleaner CLb, which is an example of a cleaning unit for the intermediate transfer body, is disposed downstream of the secondary transfer region Q4 in a direction of rotation of the intermediate image transfer belt B.

The primary transfer rollers T1y to T1k, the intermediate image transfer belt B, the secondary transfer unit T2, and the like constitute a transfer device T1+T2+B of Example 1. Further, the image forming sections Uy to Uk and the transfer device T1+T2+B constitute an image recording section Uy to Uk+T1+T2+B of Example 1.

In FIG. 1, pairs of left and right guiding rails GR, which are examples of guiding members, are provided at three stages below the image forming sections Uy to Uk. Sheet feeding trays TR1 to TR3, which are examples of medium accommodating sections, are supported by the guiding rails GR so as to enter and exit in the front-back direction. The sheet feeding trays TR1 to TR3 contain recording sheets S which are examples of the media.

Pickup rollers Rp, which are examples of unloading members, are disposed above the right sides of the sheet feeding trays TR1 to TR3. Separating rollers Rs, which are examples of separating members, are disposed downstream of the pickup rollers Rp in a transport direction of the recording sheets S. A sheet feeding path SH1, which is an example of a transport path of the media and extends upward, is formed downstream of the separating rollers Rs in the transport direction of the recording sheets S. Plural feed rollers Ra, which are examples of transport members, are disposed in the sheet feeding path SH1.

In the sheet feeding path SH1, registration rollers Rr, which are examples of members for adjusting transport timing, are disposed upstream of the secondary transfer region Q4.

A fixing device F is disposed downstream of the secondary transfer region Q4 in the transport direction of the sheets S. The fixing device F includes: a heating roller Fh which is an example of a heat fixing member; and a pressure roller Fp which is an example of a pressure fixing member. A region of contact between the heating roller Fh and the pressure roller Fp constitutes a fixing region Q5.

A sheet discharging path SH2, which is an example of a transport path, is disposed above the fixing device F. A discharged sheet tray TRh, which is an example of a medium discharging section, is formed on the upper surface of the printer section U1.

The sheet discharging path SH2 extends toward the discharged sheet tray TRh. A sheet discharging roller Rh, which is an example of a medium transport member, is disposed at the downstream end of the sheet discharging path SH2.

Description of Image Formation Operation

In the copy machine U of Example 1 having the configuration, when an operator manually places a sheet of the original document Gi on the platen glass PG and performs copying, the reading unit U2a moves from the home position in the left-right direction and scans the sheet of the original document Gi on the platen glass PG while performing exposure thereon. Further, when the sheet of the original document Gi is automatically transported using the auto-feeder U3 and is subjected to copying, the reading unit U2a moves from the home position and stops at a position for reading the sheet of the original document indicated by the dashed line of FIG. 1. Then, the plural sheets of the original document Gi contained in the original document tray TG1 are sequentially transported to and passes through the position for reading the sheet of the original document on the platen glass PG, and are discharged to the original document discharging tray TG2. Consequently, the sheets of the original document Gi, which sequentially pass through the reading position on the platen glass PG, are scanned by being exposed through the stationary reading unit U2a. In addition, light reflected from the original document Gi is received by the reading unit U2a. The reading unit U2a converts the received reflected light of the original document Gi into an electric signal.

The electric signal, which is output from the reading unit U2a, is input to the image processing section GS. The image processing section GS converts the electric signal of an image having R, G, and B colors which is read by the reading unit U2a, into image information of yellow Y, magenta M, cyan C, and black K for latent image formation. The image processing section GS outputs the converted image information to the writing circuit DL of the printer section U1. In addition, when the image is a single-color image, that is, a so-called monochrome image, the image processing section GS outputs only image information of black K to the writing circuit DL.

The writing circuit DL outputs a control signal corresponding to the input image information to the exposure device ROS. The exposure device ROS outputs the laser beams Ly to Lk corresponding to the control signal.

The photoconductors PRy to PRk rotate when image formation is started. A charging voltage is applied from the power circuit E to the charging rollers CRy to CRk. Accordingly, the surfaces of the photoconductors PRy to PRk are charged by the charging rollers CRy to CRk. Electrostatic latent images are formed on the surfaces of the charged photoconductors PRy to PRk by the laser beams Ly to Lk in the writing regions Q1y to Q1k. The developing devices Gy, Gm, Gc, and Gk develop electrostatic latent images of the photoconductors PRy to PRk into the toner images, which are visible images, in the development regions Q2y to Q2k.

The developed toner images are transported to the primary transfer regions Q3y, Q3m, Q3c, and Q3k that come into contact with the intermediate image transfer belt B which is an example of an intermediate transfer body. In the primary transfer regions Q3y, Q3m, Q3c, and Q3k, a primary transfer voltage having a polarity opposite to the polarity of the charge of the toner is applied from the power circuit E to the primary transfer rollers T1y to T1k. Accordingly, the primary transfer rollers T1y to T1k transfer the toner images on the photoconductors PRy to PRk onto the intermediate image transfer belt B. In addition, in a case of a multicolor toner image, the toner image on the downstream side is transferred to be superposed upon the toner image transferred onto the intermediate image transfer belt B in the primary transfer region on the upstream side.

The photoconductor cleaners CLy to CLk clean residual substances and attached substances on the surfaces of the photoconductors PRy to PRk which are subjected to the primary transfer. The charging rollers CRy to CRk recharge the cleaned surfaces of the photoconductors PRy to PRk.

The single-color or multicolor toner images, which are transferred onto the intermediate image transfer belt B by the primary transfer rollers T1y to T1k in the primary transfer regions Q3y to Q3k, are transported to the secondary transfer region Q4.

The used pickup roller Rp of the sheet feeding trays TR1 to TR3 picks up the sheets S on which the images are recorded. When plural sheets S are repeatedly picked up, the separating rollers Rs separate the sheets S, which are picked up by the pickup roller Rp, one by one. The feed rollers Ra transport the sheets S, which are separated by the separating roller Rs, through the sheet feeding path SH1. The sheets S, which are transported through the sheet feeding path SH1, are sent to the registration rollers Rr.

The registration rollers Rr transport the sheet S to the secondary transfer region Q4 at the timing for transporting the toner image, which is formed on the intermediate image transfer belt B, to the secondary transfer region Q4. A secondary transfer voltage having a polarity opposite to the polarity of the charge of the toner is applied to the secondary transfer roller T2b by the power circuit E. Consequently, the toner image on the intermediate image transfer belt B is transferred onto the sheet S from the intermediate image transfer belt B.

The belt cleaner CLb cleans substances attached to the surface of the intermediate image transfer belt B which is subjected to the secondary transfer.

The recording sheet S, onto which the toner image is secondarily transferred, is fixed by heat when passing through the fixing region Q5.

The recording sheet S, on which the image is fixed, is transported through the sheet discharging path SH2. The sheet discharging rollers Rh discharge the sheet S, which is transported through the sheet discharging path SH2, to the discharged sheet tray TRh.

Description of Image Reading Device

Figure 3:
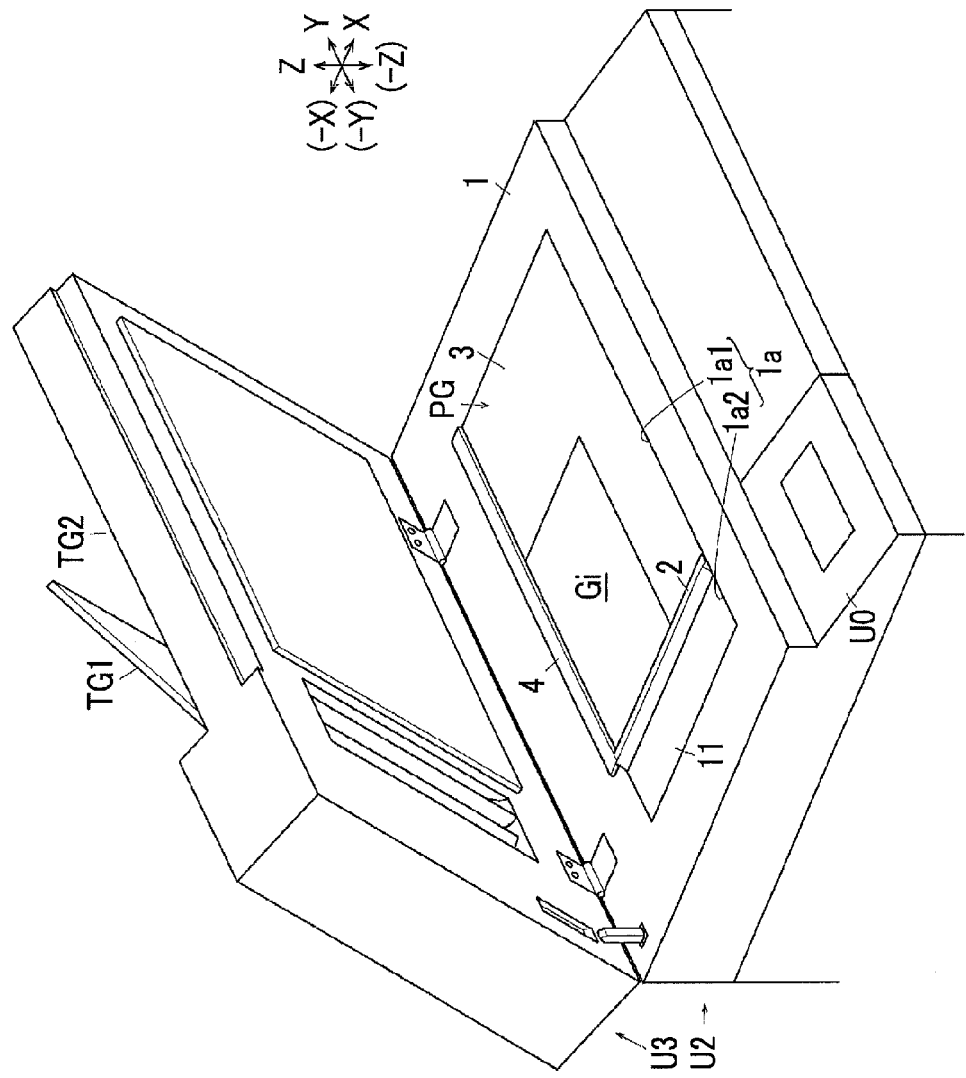
FIG. 3 is a perspective view of an opening and closing member and an image reading device of Example 1.

FIG. 3 is a perspective view of an opening and closing member and an image reading device of Example 1.

In FIG. 3, the scanner section U2, which is an example of the image reading device, has a casing 1 which is an example of a housing. A glass supporting opening 1a, which is an example of an opening, is formed on the upper surface of the casing 1. The glass supporting opening 1a is formed in a rectangular shape which is long in the left-right direction. A planar partition portion 2, which extends in the front-back direction, is formed on the left portion of the glass supporting opening 1a. The partition portion 2 partitions the glass supporting opening 1 into a manual reading opening 1a1 on the right side and an auto-reading opening 1a2 on the left end side. Accordingly, the reading openings 1a1 and 1a2 are formed in a rectangular shape.

Figure 4:
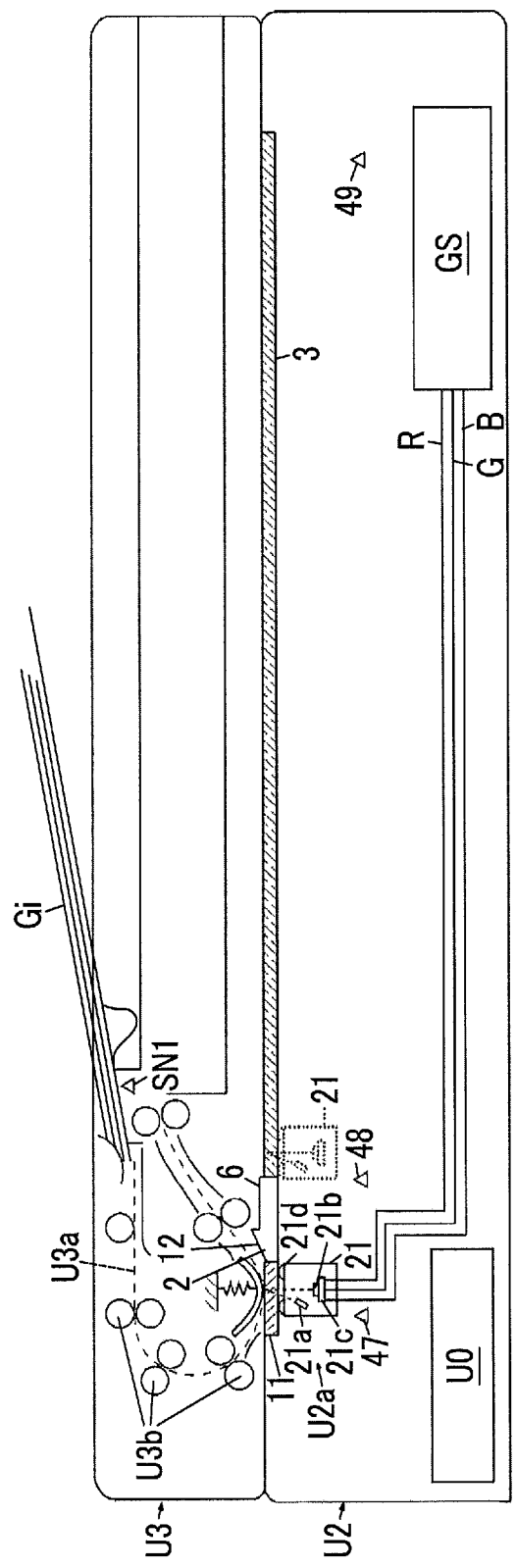
FIG. 4 is an explanatory diagram of the image reading device of Example 1.

FIG. 4 is an explanatory diagram of the image reading device of Example 1.

In FIGS. 3 and 4, the manual reading opening 1a1 supports a reading glass 3 which is an example of the platen. The reading glass 3 of Example 1 is formed of a glass having a transparent plate shape. The reading glass 3 supports a medium on which an image is recorded, that is, the so-called original document Gi. In addition, the reading glass 3 is formed based on the preset maximum size of the original document which is readable. In Example 1, as an example of the maximum size of the readable original document, a standard size A3 is set. That is, the reading glass 3 of Example 1 is formed such that the size thereof in the left-right direction corresponds to the long side of the A3 size and the size thereof in the front-back direction corresponds to the short side of the A3 size.

A rear-side alignment section 4, which has a plate shape extending in the left-right direction, is supported on the rear side of the reading glass 3. The rear-side alignment section 4 is disposed along the rear end of the reading glass 3. The rear-side alignment section 4 is disposed in a state where it has a difference in level from the upper surface of the reading glass 3 in the upward direction. Accordingly, the trailing edge of the original document Gi is brought into contact with the rear-side alignment section 4, whereby it is possible to align the position of the rear end of the original document Gi. Further, a left-side alignment section 6, which has a plate shape extending in the front-back direction, is supported on the left side of the reading glass 3, that is, the right portion of the partition portion 2. The left-side alignment section 6 is disposed along the left end of the reading glass 3. The left-side alignment section 6 is formed in a plate shape that has a difference in level from the upper surface of the reading glass 3 in the upward direction. Accordingly, the left edge of the original document Gi is brought into contact with the left-side alignment section 6, whereby it is possible to align the position of the left end of the original document Gi.

In FIGS. 3 and 4, the auto-reading opening 1a2 supports the reading glass 11 which is an example of an optical transparent member on the auto-reading side. The reading glass 11 of Example 1 is formed of a glass having a transparent plate shape. In addition, the length of the reading glass 11 in the front-back direction is formed based on the preset maximum size of the original document which is readable. In Example 1, the length of the reading glass 11 in the front-back direction is formed to correspond to the length of the short side of the A3 size. The reading glass 3 and the reading glass 11 constitute the platen glass PG which is an example of a supporting surface of Example 1.

An original document guide 12, which is an example of a member for guiding the original document and extends in the front-back direction, is supported on the right side of the reading glass 11, that is, the left portion of the partition portion 2. The original document guide 12 is formed in a shape in which the height of the left end thereof is set to be lower than the upper surface of the reading glass 11 and which is inclined upward on the right side.

Figure 5:
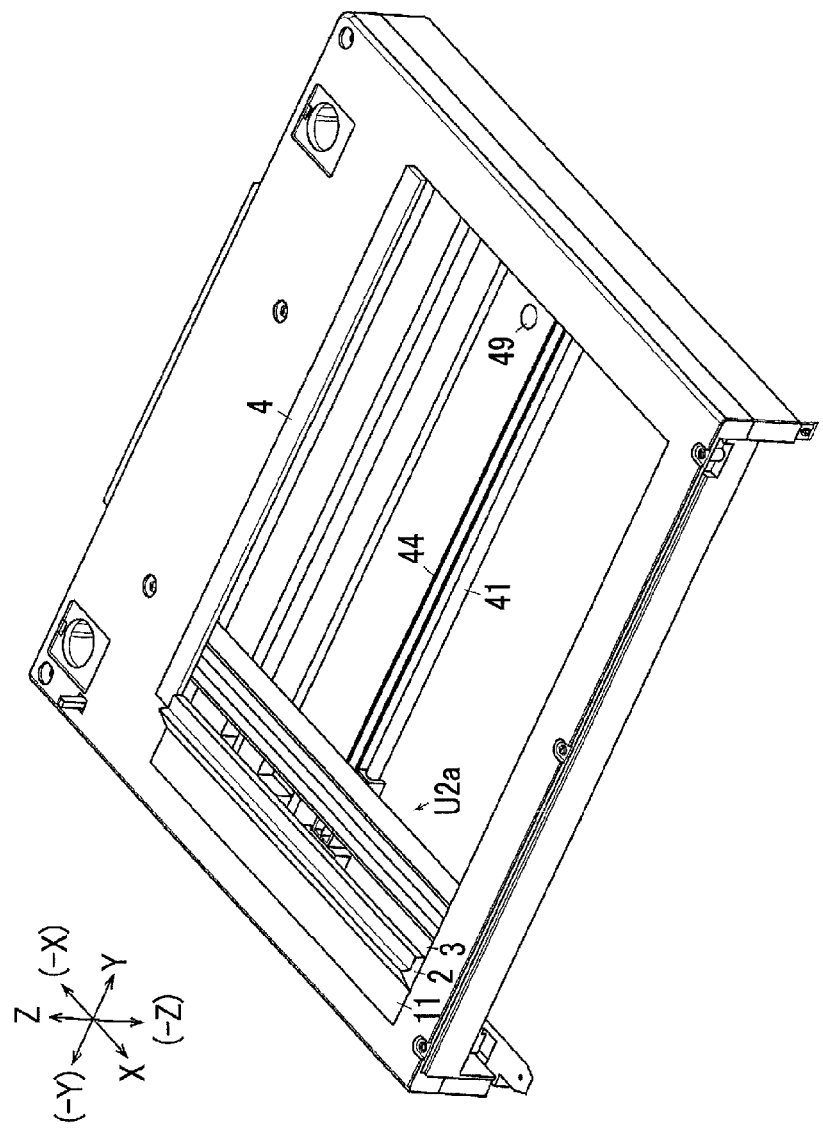
FIG. 5 is a perspective view of a scanner section of Example 1.

FIG. 5 is a perspective view of a scanner section of Example 1.

Figure 6:
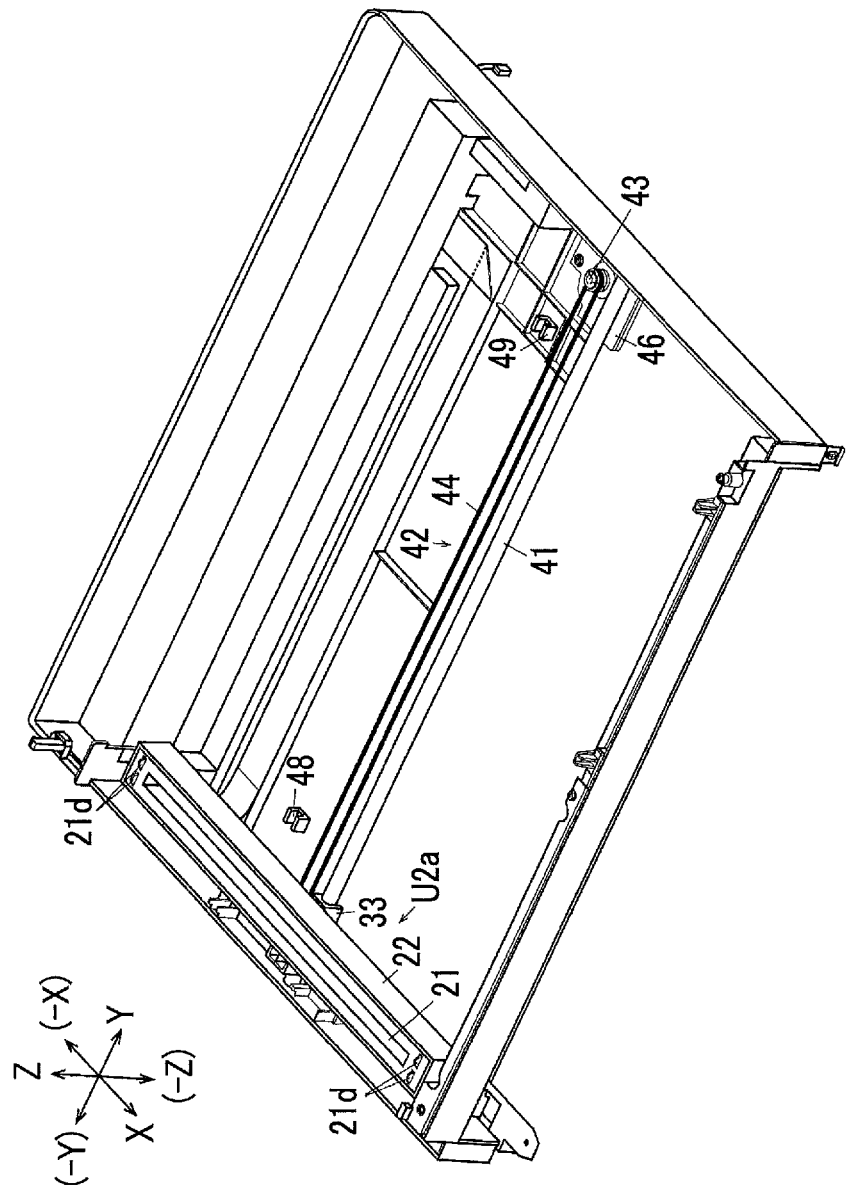
FIG. 6 is an explanatory diagram of a condition where a cover of a scanner section shown in FIG. 5 is detached.

FIG. 6 is an explanatory diagram of a condition where a cover of the scanner section shown in FIG. 5 is detached.

Figure 7A:
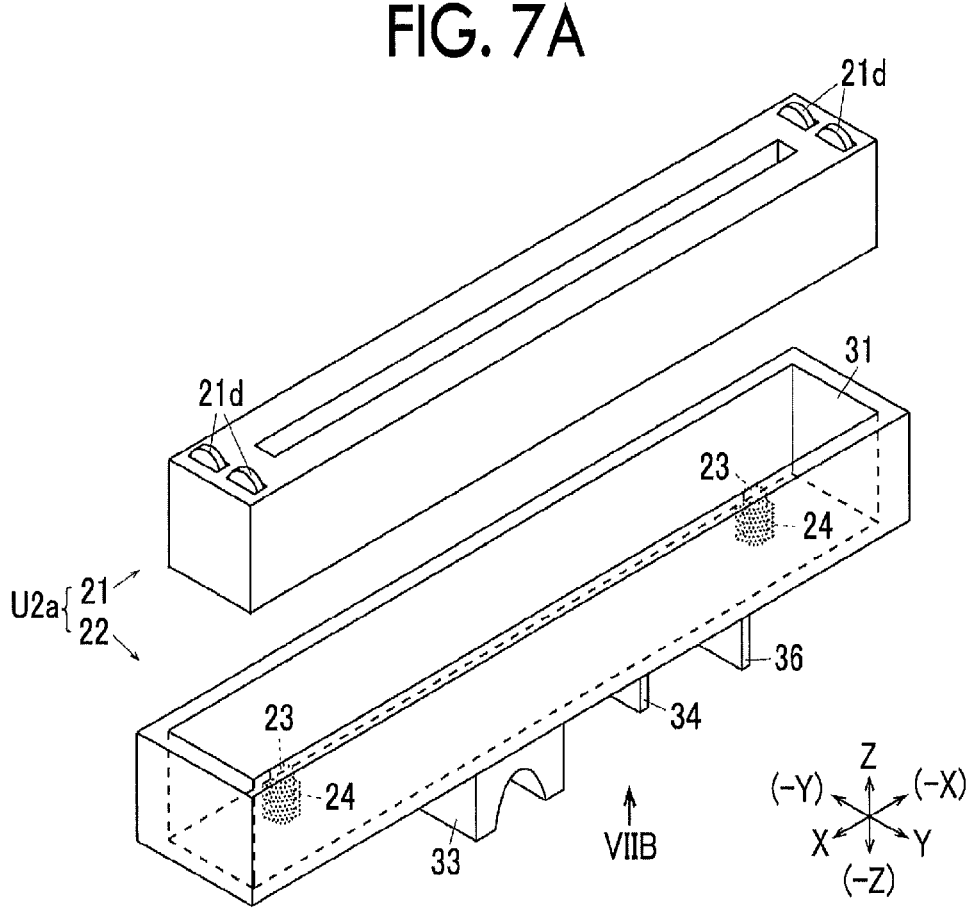
FIGS. 7A and 7B are explanatory diagrams of main sections of a reading unit of Example 1, where
Figure 7B:
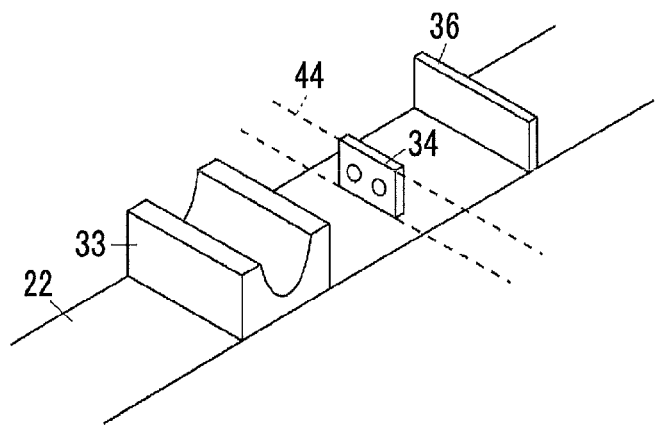

FIGS. 7A and 7B are explanatory diagrams of main sections of a reading unit of Example 1, where FIG. 7A is an explanatory diagram of exploded sections, and FIG. 7B is a diagram viewed from a direction of the arrow VIIB of FIG. 7A.

In FIGS. 1 and 4, the reading unit U2a is disposed below the platen glass PG.

The reading unit U2a includes: a CIS (Contact Image Sensor) unit 21 which is an example of a reading member; and a carriage 22 which is an example of a supporting member that supports the CIS unit 21.

The CIS unit 21 extends in a main scanning direction which is an example of a first direction. In addition, in Example 1, the main scanning direction corresponds to the front-back direction. A lamp 21a, which is an example of a light source, is supported on the inside of the CIS unit 21. The lamp 21a irradiates the original document Gi on the upper surface of the reading glass 3 with light for reading, that is, so-called illumination light. A light receiving unit 21b, which reads an image by receiving the illumination light reflected by the original document Gi, is supported on the inside of the CIS unit 21. The light, which is received by the light receiving unit 21b, is converted into an electric signal by a substrate 21c, and is sent to the image processing section GS. In addition, the CIS may employ various configurations as the related art.

Since the focal length of the CIS unit 21 of Example 1 is small, it is necessary to keep a distance between the CIS unit 21 and the original document constant. Therefore, a distance between the CIS unit 21 and the platen glass PG, on which the original document Gi is placed, is maintained, and four contact portions 21d, which protrude upward and come into contact with the platen glass PG, are provided at both ends of the CIS unit 21. The upper surface of the contact portion 21d is formed in an arc shape, and is configured to reduce a frictional resistance even when the contact portion 21d moves while coming into contact with the lower surface of the reading glass 3.

Both of front and rear ends of the carriage 22 support guide protrusions 23 which are examples of guide portions for urging. Each guide protrusion 23 is formed in a columnar shape that extends upward. The guide protrusions 23 are fitted into holes which are formed on the CIS unit 21 and are not shown in the drawing, and support the CIS unit 21 such that the CIS unit 21 is movable in the up-down direction.

Springs 24, which are examples of clamping members, are mounted on the guide protrusions 23. The springs 24 urge the CIS unit 21 upward. Consequently, the CIS unit 21, which is pushed by the springs 24, is maintained in a state where the contact portions 21d tightly press against the lower surface of the reading glass 3.

That is, the distance between the original document Gi on the upper surface of the reading glass 3 and the lamp 21a or the light receiving unit 21b of the CIS unit 21 is maintained at a preset spacing.

The carriage 22 of Example 1 is formed in a box shape that extends in the front-back direction. An accommodating section 31 capable of containing the CIS unit 21 is formed in the carriage 22. In addition, the sizes of the accommodating section 31 in the front-back and left-right directions are set to be larger than the sizes of the CIS unit 21.

A guided portion 33, which is an example of a guided portion, is formed on the lower surface of the carriage 22 at the center thereof in the front-back direction. The guided portion 33 is formed in a semi-cylindrical shape that extends in the left-right direction.

A belt fixing portion 34, which is an example of a fixing portion of a moving member, is formed behind the guided portion 33.

Further, a detection plate 36, which is an example of a detected portion, is formed behind the belt fixing portion 34. The detection plate 36 is formed in a plate shape that extends in the left-right direction.

The CIS unit 21, the carriage 22, and the like constitute the reading unit U2a of Example 1.

In FIGS. 5 and 6, a guiding shaft 41, which is an example of a unit guiding member and an example of a unit supporting member, is supported below the reading unit U2a. The guiding shaft 41 extends in the left-right direction, which is an example of a second direction, that is, a sub-scanning direction. The guiding shaft 41 movably supports the guided portion 33 of the reading unit U2a. That is, the reading unit U2a is supported to be movable in the left-right direction along the guiding shaft 41. Accordingly, in Example 1, the left-right direction is set as the sub-scanning direction of the CIS unit 21.

A moving mechanism 42, which is an example of a moving member, is disposed behind the guiding shaft 41. The moving mechanism 42 has a pair of left and right pulleys 43 which are examples of supporting members. In addition, in FIGS. 5 and 6, due to the direction of the view, only the pulley 43 on the right side is shown, and the pulley 43 on the left side is not shown.

The pulleys 43 rotatably support an endless belt 44 which is an example of a power transfer member. One of two portions of the belt 44, which linearly extend in the left-right direction, supports the belt fixing portion 34 of the reading unit U2a. A motor 46, which is an example of a driving source and is able to perform forward or backward driving, transfers power to the belt 44. Accordingly, when the motor 46 performs forward or backward driving, the belt 44 rotates forward or backward, and the reading unit U2a moves in the left-right direction along the guiding shaft 41.

Figure 8:
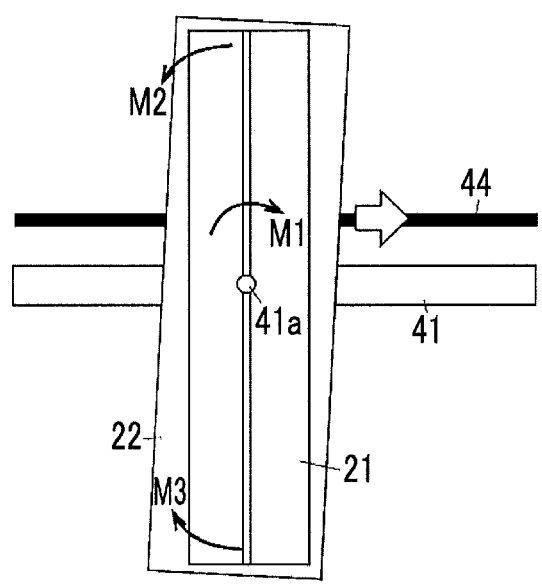
FIG. 8 is a top plan view of the reading unit of Example 1.

FIG. 8 is a top plan view of the reading unit of Example 1.

In FIG. 8, in the reading unit U2a of Example 1, the CIS unit 21 is supported to be inclined at an angle θ to the carriage 22 in the main scanning direction, that is, the front-back direction. That is, the carriage 22 is supported to be guidable by the guiding shaft 41, and is driven by the belt 44 which is supported on the back side behind the guiding shaft 41. Accordingly, a moment M1, of which a center 41a is at a position of the guiding shaft 41, acts on the carriage 22 through the driving force of the belt 44. Accordingly, when moving in the sub-scanning direction, the carriage 22 is inclined in the main scanning direction in a state where the position of the guiding shaft 41 is the center 41a, by rattling between the guiding shaft 41 and the guided portion 33 and the like. Accordingly, in Example 1, positions and dimensions of components of the guide protrusions 23 and an opening of the CIS unit 21 are set such that the CIS unit 21 is supported to be inclined at the angle θ to negate the inclination of the carriage 22 in the main scanning direction. Accordingly, in Example 1, while the reading unit U2a moves in the sub-scanning direction, the CIS unit 21 is maintained to be hardly inclined with respect to the main scanning direction.

In the reading unit U2a of Example 1, the pair of front and rear springs 24 tightly presses the contact portions 21d of the CIS unit 21 against the reading glass 3. Accordingly, frictional force acts at the position of the contact between the contact portion 21d and the reading glass 3, and thus moments M2 and M3 act in the forward and backward directions, in response to the frictional force. Here, if there is an individual difference between elastic forces applied to the front and rear by the pair of front and rear springs 24, the moments M2 and M3 applied to the front and rear may be different. For example, M1 may be small since the position of the belt 44 is close to the guiding shaft 41, and M2 and M3 may be large since the elastic forces of the springs 24 are set to be strong. In this case, the sum of the moments, that is, M1+M3−M2 tends to change to be positive or negative. If the sum of the moments is positive, that is, if M1+M3−M2>0, the state shown in FIG. 8 is attained. However, if the sum of the moments is negative, that is, if M1+M3−M2<0, the carriage 22 is inclined in a direction opposite to that in the state shown in FIG. 8. Accordingly, if the moments M2 and M3 applied by the springs 24 are large, there is a concern about unstableness as to whether the inclination direction of the carriage 22 is the direction shown in FIG. 8 or the direction opposite to that shown in FIG. 8. In contrast, in Example 1, the position of the guiding shaft 41, the position of the belt 44, and the elastic forces of the springs 24 are set to satisfy M1+M3−M2>0 in any case. Accordingly, the carriage 22 is configured such that the posture thereof is stabilized as shown in FIG. 8 when moving in a direction of movement for reading the original document, that is, toward the right side.

In FIGS. 4 to 6, a first unit sensor 47, which is an example of a detection member that detects the reading unit U2a, is disposed below the space, through which the reading unit U2a passes, so as to correspond to the home position of the reading unit U2a. The first unit sensor 47 detects whether or not the reading unit U2a has moved to the home position indicated by the dashed line of FIG. 4. In addition, the home position of Example 1 is set such that a reading position P11 of the reading unit U2a is movable to the inside of the reading glass 11 for auto-reading in the left-right direction.

The unit sensor 47 of Example 1 is configured with an optical sensor which has been known in the related art. The optical sensor has a light emitting portion and a light receiving unit. In addition, the detection plate 36 may be configured to pass through the gap between the light emitting portion and the light receiving unit. Accordingly, when the detection plate 36 is present between the light emitting portion and the light receiving unit, the light receiving unit does not receive light. In contrast, when the detection plate 36 is not present between the light emitting portion and the light receiving unit, the light receiving unit receives light. Consequently, by detecting whether or not the detection plate 36 is present, the unit sensor 47 may detect whether or not the reading unit U2a is moving to the home position.

A second unit sensor 48 is disposed on the right of the first unit sensor 47 so as to correspond to a reading start position of the reading unit U2a for manual reading of the original document. The second unit sensor 48 is disposed at a position corresponding to the reading position P11 of the reading unit U2a which has moved to the left end of the reading glass 3.

A third unit sensor 49 is disposed on the right of the second unit sensor 48 so as to correspond to a reading end position of the reading unit U2a for manual reading of the original document. The third unit sensor 49 is disposed to correspond to the reading position P11 of the reading unit U2a which has moved to the right end of the reading glass 3.

In addition, the unit sensors 48 and 49 are configured with optical sensors, in a similar manner to that of the first unit sensor 47.

Description of Control Section of Example 1

Figure 9:
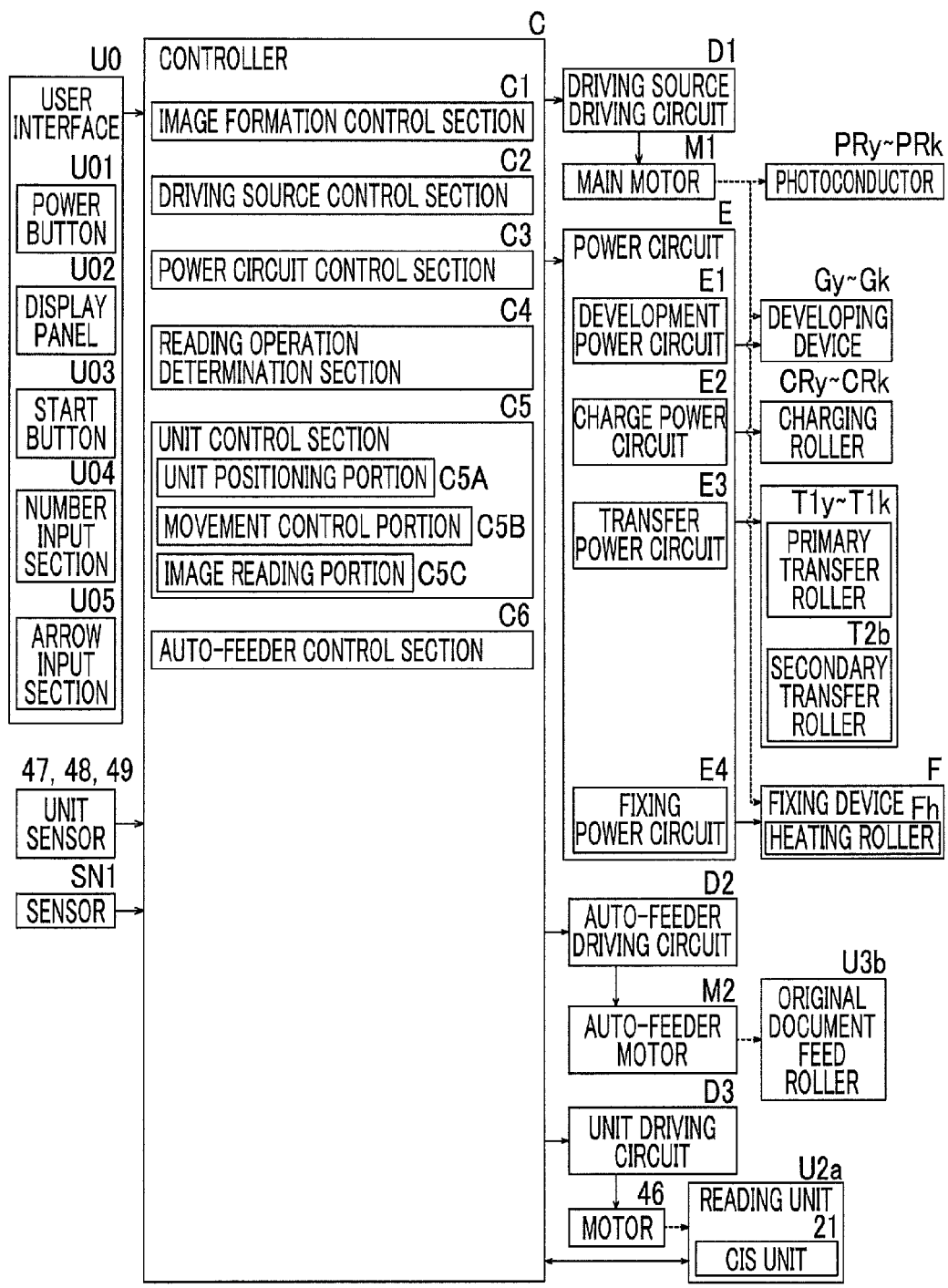
FIG. 9 is a block diagram illustrating functions provided in control sections of the image forming apparatus of Example 1.

FIG. 9 is a block diagram illustrating functions provided in control sections of the image forming apparatus of Example 1.

In FIG. 9, a controller C, which is an example of a control section provided in the copy machine U, has an input/output interface I/O that inputs and outputs signals from and to the external devices. Further, the controller C has a read only memory (ROM) that stores programs and information for performing necessary processes. Further, the controller C has a random access memory (RAM) that temporarily stores necessary data. Further, the controller C has a central processing unit (CPU) that performs processes corresponding to the programs stored in the ROM and the like. Consequently, the controller C of Example 1 is constituted by a small-size information processing device, that is, a so-called micro computer. Accordingly, the controller C may implement various functions by executing the programs stored in the ROM and the like.

Signal Output Components Connected to Controller C

Output signals are input to the controller C of the printer section U1. The output signals are output from signal output components such as the user interface U0, the CIS unit 21, the unit sensors 47, 48, and 49, and a sensor SN1.

U0: User Interface

The user interface U0 includes a power button U01 which is an example of a section for applying power; a display panel U02 which is an example of a display section; a start button U03 which is an example of a section for inputting the start of copying; a number input section U04; an arrow input section U05; and the like.

21: CIS Unit

The CIS unit 21 receives the light reflected from the original document Gi on the platen glass PG, and outputs an electric signal corresponding to an amount of the received light.

47, 48, 49: Unit Sensors

The unit sensors 47, 48, and 49 detect whether or not the detection plate 36 of the reading unit U2a is present. Accordingly, the first unit sensor 47 detects whether or not the reading unit U2a is present at the home position indicated by the solid line of FIG. 4. The second unit sensor 48 detects whether or not the reading unit U2a is present at the reading position for auto-reading of the original document indicated by the dashed line of FIG. 4. The third unit sensor 49 detects whether or not the reading unit U2a is present at the right end position.

SN1: Sensor

The sensor SN1 of the auto-feeder U3 detects whether or not the original document Gi is stacked on the original document tray TG1.

Control Target Components Connected to Controller C

The controller C is connected to a driving source driving circuit D1, an auto-feeder driving circuit D2, a unit driving circuit D3, a power circuit E, and other control components which are not shown. The controller C outputs control signals to the circuits D1 to D3 and E, and the like.

D1: Driving Source Driving Circuit

The driving source driving circuit D1 drives a main motor M1 which is an example of a driving source, thereby rotating the photoconductors PRy to PRk, developer holding members of the developing devices Gy to Gk, the intermediate image transfer belt B, the heating roller Fh of the fixing device F, the feed rollers Ra, and the like.

D2: Auto-Feeder Driving Circuit

The auto-feeder driving circuit D2, which is an example of a driving circuit for transporting the original document, drives an auto-feeder motor M2 which is an example of a driving source for transporting the original document, thereby rotating the original document feed rollers U3b which are disposed in the original document transport path U3a.

D3: Unit Driving Circuit

The unit driving circuit D3, which is an example of a reading unit driving circuit, drives the motor 46, thereby moving the reading unit U2a in the left-right direction through the belt 44 and the like.

E: Power Circuit

The power circuit E has a development power circuit E1, a charge power circuit E2, a transfer power circuit E3, and a fixing power circuit E4.

E1: Development Power Circuit

The development power circuit E1 applies a development voltage to the developer holding members of the developing devices Gy to Gk.

E2: Charge Power Circuit

The charge power circuit E2 applies a charging voltage to the charging rollers CRy to CRk.

E3: Transfer Power Circuit

The transfer power circuit E3 applies a transfer voltage to the primary transfer rollers T1y to T1k and the secondary transfer roller T2b of the transfer device T1+T2+B.

E4: Fixing Power Circuit

The fixing power circuit E4 supplies electric power for heating to a heating member of the heating roller Fh of the fixing device F.

Functions of Controller C

The controller C has a function of executing processes corresponding to the input signals from the signal output components and outputting the control signals to the control components. That is, the controller C has the following functions.

C1: Image Formation Control Section

An image formation control section C1 controls driving of the members of the copy machine U, timing for applying the voltages, and the like based on the image information which is input from the scanner section U2, thereby executing work as an image formation operation.

C2: Driving Source Control Section

A driving source control section C2 controls driving of the main motor M1 through the driving source driving circuit D1, thereby controlling driving of the photoconductors PRy to PRk and the like.

C3: Power Circuit Control Section

A power circuit control section C3 controls the power circuits E1 to E4, thereby controlling voltages applied to the respective members or electric powers supplied to the respective members.

C4: Reading Operation Determination Section

A reading operation determination section C4 determines whether the executed reading operation is a "manual reading operation" or an "auto-reading operation". If the sensor SN1 of the auto-feeder U3 does not detect the original document Gi at the time of the input of the start button U03, the reading operation determination section C4 of Example 1 determines that the "manual reading operation" is executed. Further, if the sensor SN1 of the auto-feeder U3 detects the original document Gi at the time of the input of the start button U03, the reading operation determination section C4 of Example 1 determines that the "auto-reading operation" is executed.

C5: Unit Control Section

A unit control section C5, which is an example of a reading unit control section, has a unit positioning portion C5A, a movement control portion C5B, and an image reading portion C5C. The unit control section C5 controls the reading unit U2a, thereby reading an image from the original document Gi.

C5A: Unit Positioning Portion

The unit positioning portion C5A determines the position of the reading unit U2a based on the detection signals of the unit sensors 47 to 49. If the first unit sensor 47 detects the reading unit U2a, the unit positioning portion C5A of Example 1 determines that the reading unit U2a has moved to the home position. Further, if the second unit sensor 48 detects the reading unit U2a, the unit positioning portion C5A of Example 1 determines that the reading unit U2a has moved to the reading start position for manual reading of the original document. Furthermore, if the third unit sensor 49 detects the reading unit U2a, the unit positioning portion C5A of Example 1 determines that the reading unit U2a has moved to the reading end position for manual reading of the original document.

C5B: Movement Control Portion

The movement control portion C5B controls the motor 46 through the unit driving circuit D3, thereby moving the reading unit U2a in the left-right direction along the lower surface of the platen glass PG. If the "manual reading operation" is executed, the movement control portion C5B of Example 1 moves the reading unit U2a from the home position to the reading start position for manual reading of the original document, and thereafter moves the reading unit U2a to the reading end position, at a preset movement speed. Then, the movement control portion C5B of Example 1 moves the reading unit U2a in a direction opposite to that at the time of reading, and moves the reading unit U2a to the home position. In this case, since the movement control portion C5B of Example 1 moves the reading unit U2a in the direction opposite to that at the time of reading, the reading unit U2a passes through the home position once. Subsequently, the movement control portion C5B of Example 1 moves the reading unit U2a in the same direction as that at the time of reading, moves the reading unit U2a to the home position, and stops the reading unit U2a at the home position.

If the "auto-reading operation" is executed, in a state where the movement control portion C5B of Example 1 holds the reading unit U2a at the home position, the original document is read.

C5C: Image Reading Portion

The image reading portion C5C reads an image of the original document Gi through the CIS unit 21. In the image reading portion C5C of Example 1, the lamp 21a is turned on at the time of the start of reading of the original document, and the light receiving unit 21b starts detection, and receives the light reflected from the original document Gi and the like, and the image of the original document Gi is read based on the signals which are output by the CIS unit 21.

C6: Auto-Feeder Control Section

An auto-feeder control section C6, which is an example of a control section of an original document transport device, controls the motor M2 through the auto-feeder driving circuit D2 if the "auto-reading operation" is executed. The auto-feeder control section C6 controls driving and stopping of the original document feed rollers U3b which are supported by the auto-feeder U3. In addition, the technique of control for automatically transporting the original document Gi through the auto-feeder U3 has been known in the related art. For example, the configuration described in JP-A-2012-039316 may be applied, and thus detailed description of the auto-feeder control section C6 will be omitted.

Description of Flowchart of Example 1

Next, flow of the control in the copy machine U of Example 1 will be described with reference to a flowchart.

Description of Flowchart of Reading Operation Process at the Time of Opening and Closing in Example 1

Figure 10:
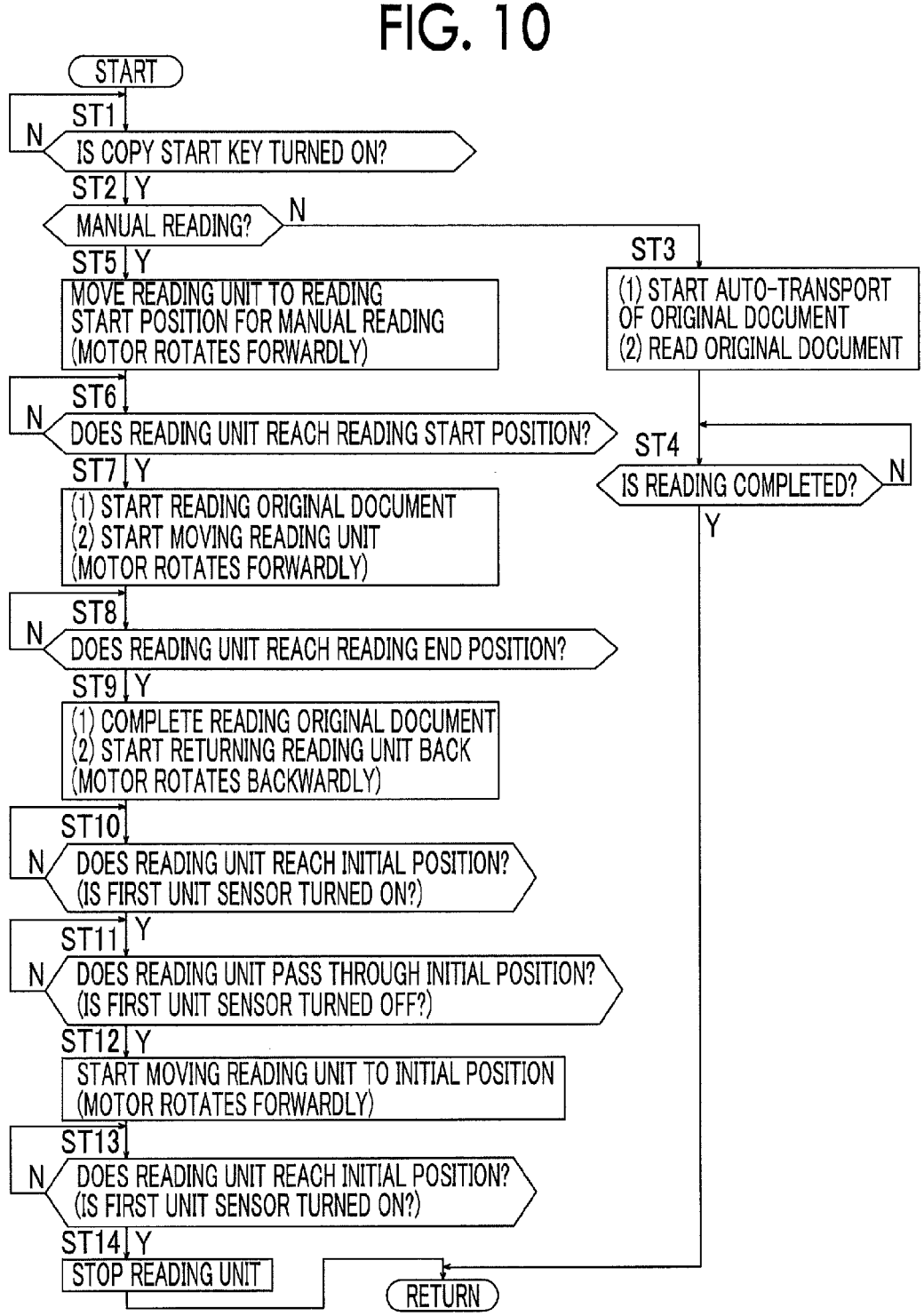
FIG. 10 is an explanatory diagram of a flowchart of a reading operation process of Example 1.

FIG. 10 is an explanatory diagram of a flowchart of a reading operation process of Example 1.

The processes of the steps ST in the flowchart of FIG. 10 are executed in accordance with a program stored in the controller C of the copy machine U. Further, the processes are executed in parallel with other various processes of the copy machine U.

At the start of the flowchart shown in FIG. 10, power is applied to the copy machine U.

In ST1 of FIG. 10, it is determined whether the copy start button U03 is turned on, that is, whether or not the copy start button U03 is input. If YES (Y), the procedure advances to ST2. If NO (N), ST1 is repeated.

In ST2, it is determined whether or not the reading operation is the "manual reading operation". If NO (N), the procedure advances to ST3. If YES (Y), the procedure advances to ST5.

In ST3, the following processes (1) and (2) are executed, and the procedure advances to ST4.

(1) Control the auto-feeder U3, and start automatically transporting the original document.

(2) Operate the reading unit U2a, and start reading the original document.

In ST4, it is determined whether or not the reading is completed, that is, whether or not reading of the final sheet of the original document transported by the auto-feeder U3 is completed. If YES (Y), the procedure returns to ST1. If NO (N), ST4 is repeated.

In ST5, through forward rotation of the motor 46, the reading unit U2a is moved toward the reading start position for manual reading of the original document. Then, the procedure advances to ST6.

In ST6, based on the detection result of the second unit sensor 48, it is determined whether or not the reading unit U2a reaches the reading start position. If YES (Y), the procedure advances to ST7. If NO (N), ST6 is repeated.

In ST7, the following processes (1) and (2) are executed, and the procedure advances to ST8.

(1) Operate the reading unit U2a, and start reading the original document.

(2) Start moving the reading unit U2a toward the reading end position at a preset speed through forward rotation of the motor 46.

In ST8, based on the detection result of the third unit sensor 49, it is determined whether or not the reading unit U2a reaches the reading end position for manual reading of the original document. If YES (Y), the procedure advances to ST9. If NO (N), ST8 is repeated.

In ST9, the following processes (1) and (2) are executed, and the procedure advances to ST10.

(1) End the reading of the original document.

(2) Start moving the reading unit U2a toward the home position through backward rotation of the motor 46.

In ST10, based on the detection result of the first unit sensor 47, it is determined whether or not the reading unit U2a reaches the home position. That is, the first unit sensor 47 determines whether or not the "OFF" state is shifted to the "ON" state. The "OFF" state is a state where the detection plate 36 is not detected. The "ON" state is a state where the detection plate 36 is detected. If YES (Y), the procedure advances to ST11. If NO (N), ST10 is repeated.

In ST11, based on the detection result of the first unit sensor 47, it is determined whether or not the reading unit U2a passes through the home position. That is, the first unit sensor 47 determines whether or not the "ON" state is shifted to the "OFF" state again. If YES (Y), the procedure advances to ST12. If NO (N), ST11 is repeated.

In ST12, through forward rotation of the motor 46, moving the reading unit U2a toward the home position is started. Subsequently, the procedure advances to ST13.

In ST13, based on the detection result of the first unit sensor 47, it is determined whether or not the reading unit U2a reaches the home position. That is, the first unit sensor 47 determines whether or not the "OFF" state is shifted to the "ON" state again. If YES (Y), the procedure advances to ST14. If NO (N), ST13 is repeated.

In ST14, by stopping the motor 46, the reading unit U2a is stopped. Then, the procedure returns to ST1.

Function of Reading Unit of Example 1

Figure 11:
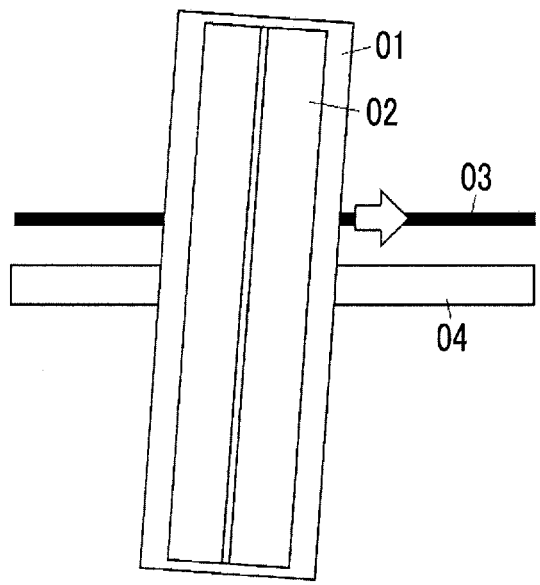
FIG. 11 is an explanatory diagram of a reading unit in the related art.

FIG. 11 is an explanatory diagram of a reading unit in the related art.

In the copy machine U of Example 1 having the configuration, when the manual reading of the original document is started, by driving of the motor 46, the belt 44 rotates, and the reading unit U2a moves from the reading start position to the reading end position.

Here, as shown in FIG. 11, in the configuration of the related art, a CIS unit 02 is directly mounted on a carriage 01. Consequently, the position, to which force is applied from a belt 03, may be deviated from the position of a guiding shaft 04. In this case, the moment acts, and thus the CIS unit 02 is inclined by rattling and the like. Accordingly, the read image of the original document is inclined, and thus a problem arises in that the accuracy in image reading is lowered.

In order to cope with the problem, the following configuration is conceivable: the belt 03 is provided not only behind the guiding shaft 04 but also at a position symmetric to the front side, thereby canceling the moment. However, when two belts are provided, costs increase, and the control thereof also becomes troublesome. Further, there is still a problem in that, due to individual difference between belts, eventually, the CIS unit 02 is inclined. Further, it is also conceivable that two guiding shafts 04 are provided in parallel so as to stabilize the guide. However, there is still a problem in that costs increase, it is practically difficult to completely eliminate rattling caused by moving parts, and the CIS unit 02 is inclined.

In contrast, in Example 1, the CIS unit 21 is supported to be inclined with respect to the carriage 22 so as to negate the inclination of the carriage 22 formed at the time of driving the belt 44. Accordingly, the image is less inclined at the time of reading.

Particularly, in Example 1, the sum of the moments M1+M3−M2 is set to be positive, and thus the posture of the CIS unit 21 is stabilized when the CIS unit 21 moves. Thereby, the image is less inclined at the time of reading.

Figure 12:
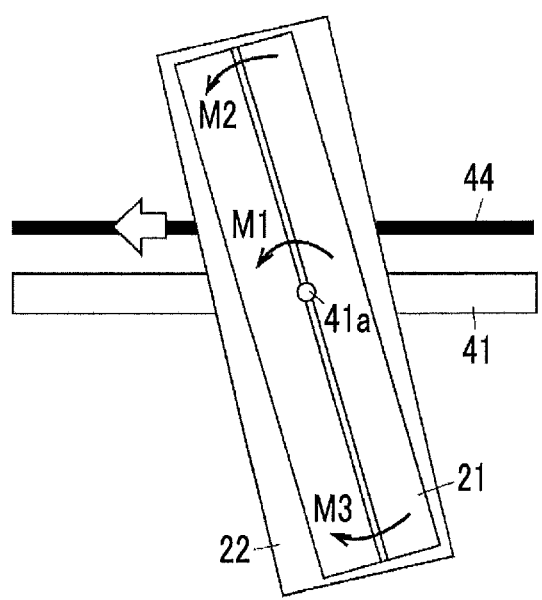
FIG. 12 is a diagram illustrating a posture of the reading unit of Example 1 when the reading unit moves toward a home position from a reading end position.

FIG. 12 is a diagram illustrating a posture of the reading unit of Example 1 when the reading unit moves toward the home position from a reading end position.

In FIG. 12, when the reading of the original document Gi is completed and the reading unit U2a moves from the reading end position toward the home position, the direction, in which the belt 44 pulls the carriage 22, is made to be opposite to the direction at the time of the reading operation. Consequently, the inclination direction of the carriage 22 is made to be opposite to that in the state shown in FIG. 8. Accordingly, in the state shown in FIG. 12, the CIS unit 21 becomes greatly inclined with respect to the main scanning direction. If the reading unit U2a is stopped at the home position in this state and then the auto reading of the original document is executed at the home position, there is a concern that the image of the original document may be read in a state where the image is inclined.

In contrast, in Example 1, if the reading unit U2 is stopped at the home position, the processes of ST10 to ST14 are performed. Accordingly, the carriage 22 passes through the home position once by moving in the leftward direction which is opposite to the direction at the time of the reading operation, thereafter moves in the rightward direction which is the same as the direction at the reading operation, and subsequently stops at the home position. Consequently, the image of the original document is prevented from being read in a state where the image is inclined.

Example 2

Figure 13:
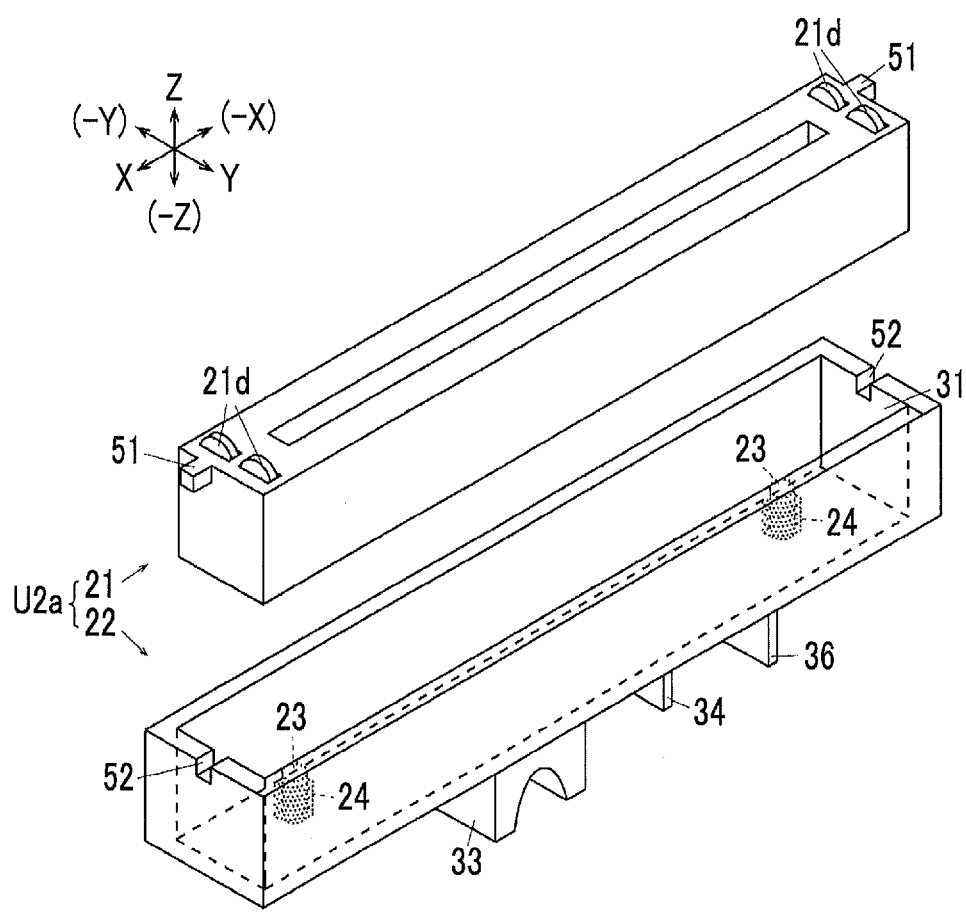
FIG. 13 is an explanatory diagram of a reading unit of an image forming apparatus of Example 2, and is a diagram corresponding to FIG. 7A of Example 1.

FIG. 13 is an explanatory diagram of a reading unit of an image forming apparatus of Example 2, and is a diagram corresponding to FIG. 7A of Example 1.

Next, Example 2 of the present invention will be described. However, in the description of Example 2, in the case where elements corresponding to Example 1 exist, those elements will be referenced by the same reference numerals and signs, and detailed description thereof will be omitted.

Example 2 is different from Example 1 mentioned above in the following configurations, but the other configurations are the same as those of Example 1.

In FIG. 13, the CIS unit 21 of Example 2 supports positioning protrusions 51 which are examples of positioning target portions and protrude outward from both of the front and rear ends. Further, positioning concave portions 52, which are examples of positioning portions and are concave downward, are formed at positions corresponding to the positioning protrusions 51 on the carriage 22. In Example 2, positions and dimensions of components of the positioning protrusions 51 and the concave portions 52 are set such that the posture of the carriage 22 is maintained by the contact between the outer surfaces of the positioning protrusions 51 and the inner surfaces of the concave portions 52 in a state where the carriage 22 is inclined at an angle θ to negate the inclination of the carriage 22 in the main scanning direction when the carriage 22 moves rightward at the time of reading.

In addition, in Example 2, the guide protrusions 23 and the holes on the CIS unit 21 are loosely fitted.

Effect of Example 2

In the CIS unit 21 of Example 2 having the configuration, in a similar manner to Example 1, when moving rightward at the time of image reading, the reading unit U2a may read the original document in a state where the CIS unit 21 is hardly inclined in the main scanning direction.

Example 3

Figure 14A:
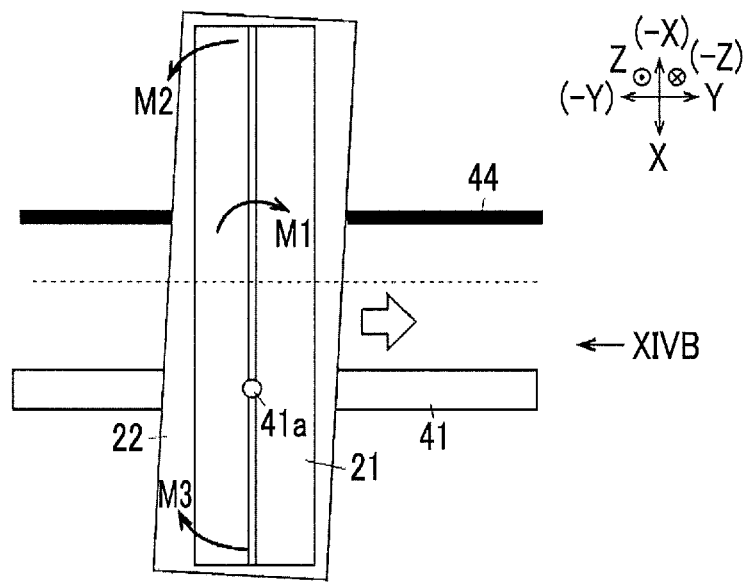
FIGS. 14A and 14B are explanatory diagrams of a reading unit of an image forming apparatus of Example 3, where
Figure 14B:
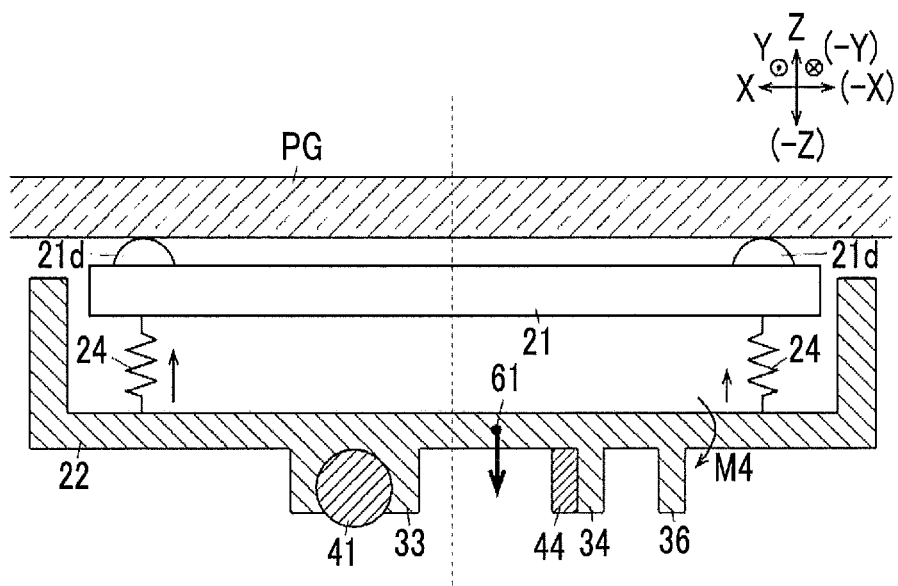

FIGS. 14A and 14B are explanatory diagrams of a reading unit of an image forming apparatus of Example 3, where FIG. 14A is a top plan view corresponding to FIG. 8 of Example 1, and FIG. 14B is a diagram viewed from a direction of the arrow XIVB of FIG. 14A.

Next, Example 3 of the present invention will be described. However, in the description of Example 3, in the case where elements corresponding to Example 1 exist, those elements will be referenced by the same reference numerals and signs, and detailed description thereof will be omitted.

Example 3 is different from Example 1 mentioned above in the following configurations, but the other configurations are the same as those of Example 1.

In FIGS. 14A and 14B, in the reading unit U2a of Example 3, the guiding shaft 41 is disposed on the front side eccentric to the center of the reading unit U2a in the front-back direction. In FIG. 14B, a barycenter position 61 of the reading unit U2a of Example 3 is present substantially at the center thereof in the front-back direction. Accordingly, due to gravity, a moment M4, of which the center is at the guiding shaft 41 eccentrically disposed on the front side, acts on the reading unit U2a in a direction in which the rear portion of the reading unit U2a descends downward. Therefore, in terms of pressing forces of the springs 24 that press the CIS unit 21 against the platen glass PG, the moment M4 acts in a direction to increase the pressing force on the front side and decrease the pressing force on the rear side. Consequently, frictional forces of the front and rear contact portions 21d against the platen glass PG are different. As a result, the magnitudes of the moments M2 and M3 caused by friction change to satisfy M3>M2.

In Example 3, while the reading unit U2a is moving rightward, regardless of parameters, M1+M3>M2 is satisfied. Consequently, in FIG. 14A, the reading unit U2a is inclined in a clockwise rotation direction. Accordingly, in the reading unit U2a of Example 3, in a similar manner to Example 1, the CIS unit 21 is supported to be inclined with respect to the carriage 22 at the angle θ so as to negate the inclination angle θ in which manufacturing errors of the respective members are accumulated.

Effect of Example 3

In the reading unit U2a of Example 3 having the configuration, in a similar manner to Example 1, when moving rightward at the time of image reading, the reading unit U2a may read the original document in a state where the CIS unit 21 is hardly inclined in the main scanning direction.

In addition, in Example 3, the guiding shaft 41 is disposed on the front side relative to the center of the reading unit U2a in the front-back direction, and the belt 44 is disposed on the rear side. However, the guiding shaft 41 may be disposed on the rear side, and the belt 44 may be disposed on the front side. In this case, the inclination direction of the reading unit U2a is reversed. Accordingly, the inclination direction of the CIS unit 21 with respect to the carriage 22 is also reversed.

Example 4

Figure 15A:
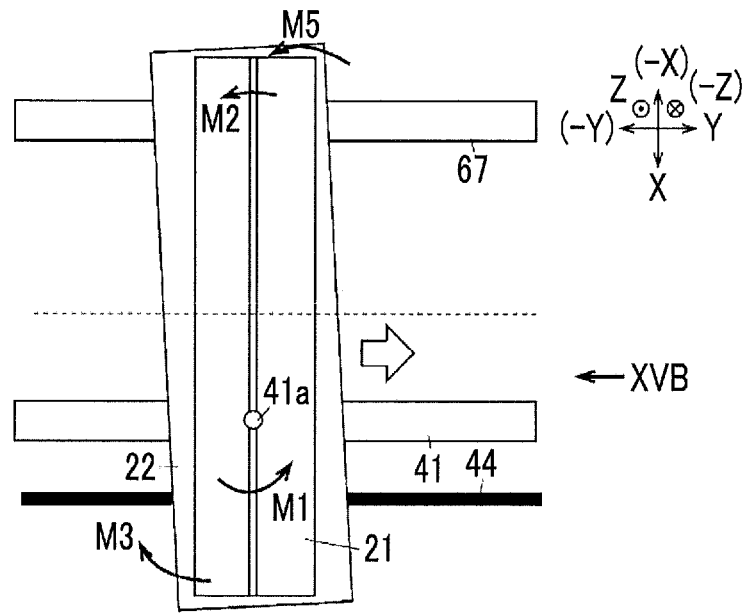
FIGS. 15A and 15B are explanatory diagrams of a reading unit of an image forming apparatus of Example 4, where
Figure 15B:
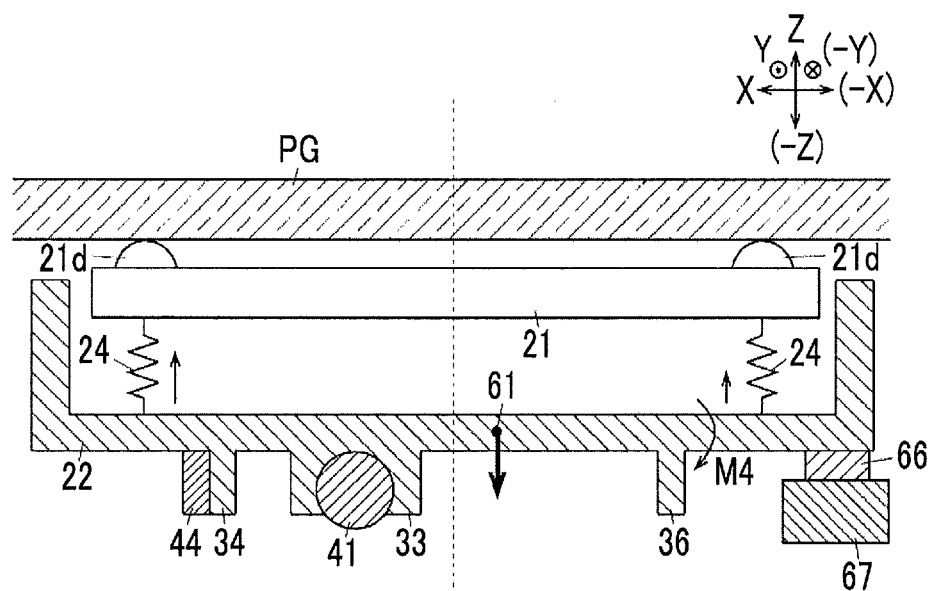

FIGS. 15A and 15B are explanatory diagrams of a reading unit of an image forming apparatus of Example 4, where FIG. 15A is a top plan view corresponding to FIG. 14A of Example 3, and FIG. 15B is a side view corresponding to FIG. 14B of Example 3.

Next, Example 4 of the present invention will be described. However, in the description of Example 4, in the case where elements corresponding to Examples 1 and 3 exist, those elements will be referenced by the same reference numerals and signs, and detailed description thereof will be omitted.

Example 4 is different from Examples 1 and 3 mentioned above in the following configurations, but the other configurations are the same as those of Examples 1 and 3.

In FIGS. 15A and 15B, in the reading unit U2a of Example 4, in contrast to in the reading unit U2a of Example 3, the belt 44 is provided ahead of the guiding shaft 41 in the front-back direction.

In accordance therewith, in Example 4, the inclination direction of the CIS unit 21 with respect to the carriage 22 is set as a direction opposite to that of Examples 1 to 3.

In Example 4, a pad 66, which is an example of a postural maintenance member, is supported at the rear end of the carriage 22. A guiding rail 67, which is an example of a second guiding member, is disposed below the pad 66. The guiding rail 67 is formed in a plate shape that extends in the front-back direction. The pad 66 of the carriage 22 is supported to be movable in the left-right direction in a state where the pad 66 comes into contact with the upper surface of the guiding rail 67.

Effect of Example 4

In the reading unit U2a of Example 4 having the configuration, due to the effect of gravity, the moment M4 acts in a direction in which the rear side of the reading unit U2a descends downward. In contrast, in Example 4, due to the contact between the guiding rail 67 and the pad 66 provided at the rear end of the carriage 22, the carriage 22 is horizontally maintained.

In addition, due to friction 68 between the pad 66 and the guiding rail 67, as shown in FIG. 15A, a moment M5 acts at the time of the image reading operation.

In Example 4, distances from the guiding shaft 41 to the front and rear contact portions 21d are different, and the acting moments M2 and M3 due to the friction of the contact portions 21d satisfy M2<M3 depending on a difference between the distances. Further, the moment M1 caused by the driving of the belt 44 acts in a direction opposite to those of Examples 1 to 3. Accordingly, even if M1 and M5 are added to the relationship of M2<M3, the result is M2<M3+M1+M5, and thus the magnitude relation does not change. As a result, in Example 4, regardless of parameters, M2<M3+M1+M5 is satisfied.

Consequently, at the time of the reading operation, the reading unit U2a of Example 4 is maintained to be inclined in a direction opposite to those of Examples 1 to 3. Accordingly, in the reading unit U2a of Example 4, the CIS unit 21 is supported to be inclined with respect to the carriage 22 in the direction opposite to those of Examples 1 to 3. As a result, in Example 4, at the time of the reading operation, the original document may be read in a state where the CIS unit 21 is hardly inclined in the main scanning direction.

In addition, even in Example 4, in a similar manner to Example 3, the positional relationship of the guiding shaft 41, the belt 44, the pad 66, and the guiding rail 67 may be reversed in the front-back direction. In this case, the inclination direction of the reading unit U2a is opposite to the direction thereof in Example 4, and the inclination direction of the CIS unit 21 with respect to the carriage 22 is also opposite to the direction thereof in Example 4.

Example 5

Figure 16A:
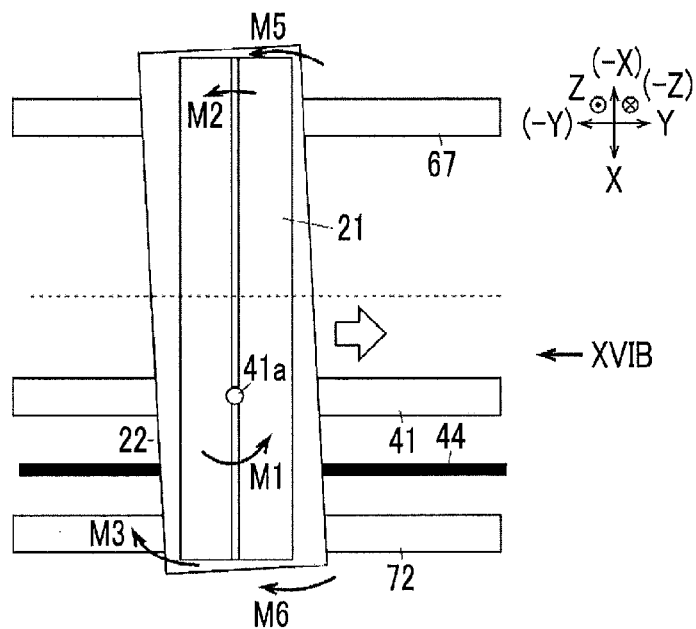
FIGS. 16A and 16B are explanatory diagrams of a reading unit of an image forming apparatus of Example 5, where
Figure 16B:
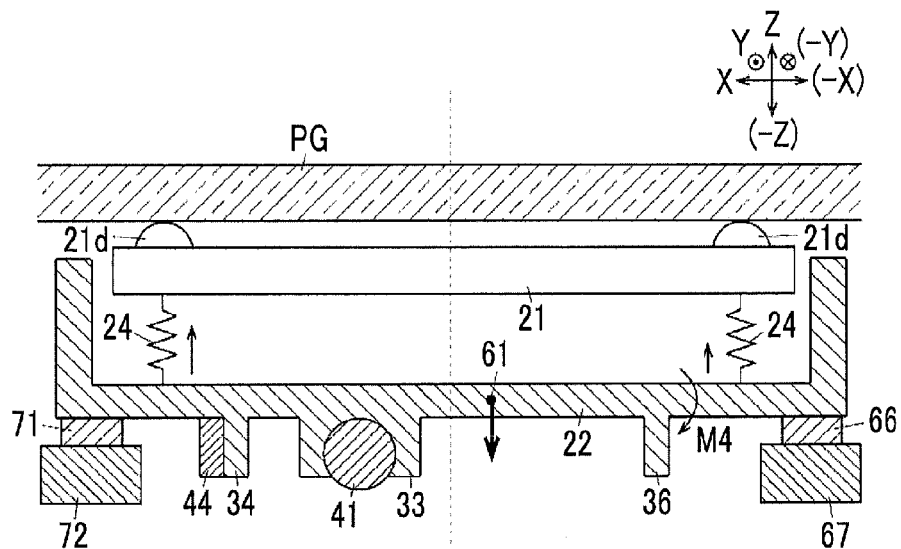

FIGS. 16A and 16B are explanatory diagrams of a reading unit of an image forming apparatus of Example 5, where FIG. 16A is a top plan view corresponding to FIG. 14A of Example 3, and FIG. 16B is a side view corresponding to FIG. 14B of Example 3.

Next, Example 5 of the present invention will be described. However, in the description of Example 5, in the case where elements corresponding to Examples 1, 3, and 4 exist, those elements will be referenced by the same reference numerals and signs, and detailed description thereof will be omitted.

Example 5 is different from Examples 1, 3, and 4 mentioned above in the following configurations, but the other configurations are the same as those of Examples 1, 3, and 4.

In FIGS. 16A and 16B, in the reading unit U2a of Example 5, a pad 71 and a guiding rail 72 are also disposed on the front side. The pad 71 and the guiding rail 72 are configured to be symmetric to the pad 66 and the guiding rail 67, which are provided on the rear side in Example 4, in the front-back direction. Accordingly, in Example 5, the pairs of the front and rear pads 66 and 71 and the guiding rails 67 and 72 are provided.

Effect of Example 5

In the reading unit U2a of Example 5 having the configuration, compared with in the configuration of Example 4, the posture of the reading unit U2a is further stabilized by the pairs of the front and rear pads 66 and 71 and the guiding rails 67 and 72.

In FIGS. 16A and 16B, in the reading unit U2a of Example 5, due to friction between the pad 71 and the guiding rail 72 on the front side, a moment M6 acts in a direction opposite to the direction of a moment M5 on the rear side. Here, regarding the moments M5 and M6 acting on the pads 66 and 71, due to the effect of the moment M4 caused by gravity, the moment M5 on the rear side is greater than the moment M6 on the front side. Accordingly, M5>M6 is satisfied.

In Example 5, in a similar manner to Example 4, the distances from the guiding shaft 41 to the front and rear contact portions 21d are different, and the acting moments M2 and M3 due to the friction of the contact portions 21d satisfy M2<M3 depending on a difference between the distances. Further, the moment M1 caused by the driving of the belt 44 acts in a direction opposite to those of Examples 1 to 3.

Accordingly, in Example 5, even if M1 is added to the relationships M2<M3 and M5>M6, the result is M2+M6<M3+M1+M5, and thus the magnitude relation does not change. As a result, in Example 5, regardless of parameters, M2+M6<M3+M1+M5 is satisfied.

Consequently, in the reading unit U2a of Example 5, at the time of the reading operation, in a similar manner to Example 4, the CIS unit 21 is supported to be inclined with respect to the carriage 22. As a result, also in Example 5, in a similar manner to Example 4, at the time of the reading operation, the original document may be read in a state where the CIS unit 21 is hardly inclined in the main scanning direction.

In addition, even in Example 5, in a similar manner to Example 4, the positional relationship of the guiding shaft 41, the belt 44, the pads 66 and 71, and the guiding rails 67 and 72 may be reversed in the front-back direction. In this case, the inclination direction of the reading unit U2a is opposite to the direction thereof in Example 5, and the inclination direction of the CIS unit 21 with respect to the carriage 22 is also opposite to the direction thereof in Example 5.

Modification Examples

Although the examples of the present invention have been described above in detail, the present invention is not limited to these examples, and may be modified into various forms without departing from the scope of the present invention described in the claims. Modification Examples (H01) to (H04) of the present invention will be described below.

(H01) In the examples, the copy machine U has been described as an example of the image forming apparatus. However, the present invention is not limited thereto, and may be applied to facsimiles or multifunction devices having multiple functions of a facsimile, a printer, a copier, and the like. Further, the present invention is not limited to an electrophotographic image forming apparatus. For example, the present invention may be applied to an image forming apparatus using an ink jet recording method or any image formation method such as a thermal head method or a lithograph printer. Furthermore, the present invention is not limited to a multi-color-development image forming apparatus, and the image forming apparatus may be also formed as a single-color, so-called monochrome, image forming apparatus. Further, in the exemplary configuration described in the examples, the scanner section U2 has been described as an example of the image reading device, and is provided in the copy machine U. However, the present invention may be applied to a configuration in which the auto-feeder U3 is removed, or a configuration of a simple scanner.

(H02) In the exemplary configuration described in the examples, the position of the reading unit U2a at the time of the process of auto-reading of the original document is set as the home position thereof. However, the present invention is not limited to this. For example, the following arbitrary modifications may be possible: the reading start position thereof at the time of the manual reading of the original document may be set as the home position; a position between the position at the time of the auto-reading of the original document and the reading start position at the time of the manual reading of the original document may be set as the home position; and a position upstream of the position at the time of the auto-reading of the original document in the sub-scanning direction may be set as the home position. In this case, preferably, before the start of the reading at each reading position, the reading unit U2a is configured to move leftward (toward the upstream side in the sub-scanning direction) and pass through the position at which the reading is executed once, and subsequently move rightward (toward the downstream side in the sub-scanning direction) and move to the reading position, and then start the reading.

(H03) In the examples, the shapes and the sizes of the guiding shaft 41 and the belt 44, the position of the guiding shaft 41 in the front-back direction, the number thereof, the posture of winding of the belt, and the like are not limited to the exemplary configurations described in the examples, and are arbitrarily modified in accordance with the application and specification.

(H04) In the examples, it is preferable to adopt a configuration where the sum of the moments M1+M3−M2 is set to be positive, but the present invention is not limited to this. For example, by reversing the positions of the guiding shaft 41 and the belt 44 in the front-back direction, M1+M2−M3 may be set to be positive (for example, the sum of the moments M1+M3−M2 may be set to be negative). In this case, in contrast to in the state shown in FIG. 8, the CIS unit 21 is inclined at the angle θ with respect to the carriage 22 in the opposite direction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a platen that supports an original document on which an image is recorded;
a reading unit that is opposed to the original document with the platen interposed therebetween, and includes a reading member which reads the image on the original document extending in a first direction, and a supporting member that supports the reading member, is movable along a second direction intersecting with the first direction, and is movably supported such that the reading member reads the image on the original document in the first and second directions;
a guiding member that extends in the second direction and guides the supporting member when the supporting member is moved in the second direction; and
a moving member that is disposed to be separated from the guiding member in the first direction and moves the supporting member along the second direction;
wherein the supporting member supports the reading member, in order for the reading member to read the original document, in a state where the reading member is inclined with respect to the supporting member in a direction to negate inclination of the supporting member which is inclined with respect to the first direction when the moving member moves the supporting member in the second direction.

2. The image reading device according to claim 1, further comprising:
a clamping member that clamps the reading member to the platen,
wherein when the reading unit moves in a direction to read the original document, at least any one of a position of the guiding member, a position of the moving member, and a clamping pressure of the reading member to the platen through the clamping member is set such that the supporting member is inclined in a preset direction with respect to the first direction.

3. The image reading device according to claim 2, further comprising:
a movement control portion that controls movement of the reading unit by controlling the moving member,
wherein in a case of stopping the reading unit, the movement control portion moves the reading unit, with respect to a stop position of the reading unit, in a direction of movement for reading the image along the second direction, and stops the reading unit at the stop position.

4. The image reading device according to claim 1, further comprising:
a movement control portion that controls movement of the reading unit by controlling the moving member,
wherein in a case of stopping the reading unit, the movement control portion moves the reading unit, with respect to a stop position of the reading unit, in a direction of movement for reading the image along the second direction, and stops the reading unit at the stop position.

5. An image reading device comprising:
a platen that supports an original document on which an image is recorded;
a reading unit that is opposed to the original document with the platen interposed therebetween, and includes a reading member which reads the image on the original document extending in a first direction, and a supporting member that supports the reading member, is movable along a second direction intersecting with the first direction, and is movably supported such that the reading member reads the image on the original document in the first and second directions;
a guiding member that extends in the second direction and guides the supporting member when the supporting member is moved in the second direction;
a moving member that is disposed to be separated from the guiding member in the first direction and moves the supporting member along the second direction;
the supporting member supporting the reading member, in order for the reading member to read the original document, in a state where the reading member is inclined with respect to the supporting member in a direction to negate inclination of the supporting member which is inclined with respect to the first direction when the moving member moves the supporting member in the second direction;
a transport member that transports the original document to the platen and is disposed upstream of the platen in a direction of movement for reading the image along the second direction; and
a movement control portion that moves the reading unit in a direction of movement for reading the image in a case of reading the original document supported upon the platen, and that moves the reading unit in the direction of movement for reading the image before reading, and then stops the reading unit in a case of reading the original document transported by the transport member.

6. An image forming apparatus comprising:
an image reading device according to claim 1 that reads an image from an original document; and
an image recording section that records the image on the medium, based on the image read by the image reading device.

* * * * *